US012593280B2

(12) United States Patent
Elshafie et al.

(10) Patent No.: US 12,593,280 B2
(45) Date of Patent: Mar. 31, 2026

(54) WAKE UP RADIO CLASSIFICATION

(71) Applicant: QUALCOMM Incorporated, San Diego, CA (US)

(72) Inventors: Ahmed Elshafie, San Diego, CA (US); Linhai He, San Diego, CA (US); Huilin Xu, Temecula, CA (US); Wei Yang, San Diego, CA (US); Yuchul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 559 days.

(21) Appl. No.: 18/046,483

(22) Filed: Oct. 13, 2022

(65) Prior Publication Data

US 2024/0129854 A1 Apr. 18, 2024

(51) Int. Cl.
*H04W 52/02* (2009.01)

(52) U.S. Cl.
CPC .............................. *H04W 52/0235* (2013.01)

(58) Field of Classification Search
CPC .......... H04W 52/0229; H04W 52/0235; Y02D 30/70
USPC ....................................................... 370/329
See application file for complete search history.

(56) References Cited

U.S. PATENT DOCUMENTS

| | | | | |
|---|---|---|---|---|
| 12,207,196 | B2 * | 1/2025 | Liu ................... | H04W 52/0235 |
| 2018/0069683 | A1 * | 3/2018 | Huang .............. | H04W 52/0222 |
| 2020/0178176 | A1 * | 6/2020 | Kim .................. | H04W 52/0216 |
| 2020/0196243 | A1 * | 6/2020 | Kim ........................ | H04W 56/00 |
| 2022/0394621 | A1 * | 12/2022 | Zhuang ............. | H04W 52/0235 |
| 2023/0300744 | A1 * | 9/2023 | Yu ..................... | H04W 52/0216 |
| | | | | 370/311 |
| 2024/0015655 | A1 * | 1/2024 | Cheng ................. | H04L 27/2602 |
| 2024/0040507 | A1 * | 2/2024 | Xu ..................... | H04W 52/0235 |
| 2024/0056965 | A1 * | 2/2024 | Choi ................. | H04W 52/0216 |
| 2024/0098644 | A1 * | 3/2024 | Ye ................... | H04W 52/0216 |
| 2024/0098645 | A1 * | 3/2024 | Ye ......................... | H04W 76/27 |
| 2024/0107456 | A1 * | 3/2024 | Elshafie ............ | H04W 52/0219 |
| 2024/0196328 | A1 * | 6/2024 | He ......................... | H04W 76/28 |
| 2024/0406906 | A1 * | 12/2024 | Kneckt ................. | H04W 60/04 |
| 2025/0016677 | A1 * | 1/2025 | He ......................... | H04W 52/02 |
| 2025/0031150 | A1 * | 1/2025 | Höglund ............... | H04L 5/0005 |

* cited by examiner

*Primary Examiner* — Robert J Lopata
(74) *Attorney, Agent, or Firm* — QUALCOMM Incorporated

(57) ABSTRACT

Various aspects of the present disclosure generally relate to wireless communication. In some aspects, a user equipment (UE) may transmit, to a network node, a class indication that indicates a wake up radio (WUR) class associated with the UE, the UE comprising a WUR and a main radio, and the WUR class may correspond to a configuration characteristic of the WUR. The UE may perform a wireless communication action based on the configuration characteristic of the WUR. Numerous other aspects are described.

30 Claims, 13 Drawing Sheets

FIG. 6

910 Transmit, to a network node, a class indication that indicates a wake up radio (WUR) class associated with the UE, the UE comprising a WUR and a main radio (MR), and the WUR class corresponding to a configuration characteristic of the WUR 920 Perform a wireless communication action based on the configuration characteristic of the WUR

900

Receive, from a user equipment (UE), a class indication that indicates a wake up radio (WUR) class associated with the UE, the UE comprising a WUR and a main radio (MR), and the WUR class corresponding to a configuration characteristic of the WUR

1010

Perform a wireless communication action based on the configuration characteristic of the WUR

1020

1000

WAKE UP RADIO CLASSIFICATION

FIELD OF THE DISCLOSURE

Aspects of the present disclosure generally relate to wireless communication and to techniques and apparatuses for wake up radio classification.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to transmit, to a network node, a class indication that indicates a wake up radio (WUR) class associated with the UE, the UE comprising a WUR and a main radio (MR), and the WUR class corresponding to a configuration characteristic of the WUR. The one or more processors may be configured to perform a wireless communication action based on the configuration characteristic of the WUR.

Some aspects described herein relate to a network node for wireless communication. The network node may include a memory and one or more processors coupled to the memory. The one or more processors may be configured to receive, from a UE, a class indication that indicates a WUR class associated with the UE, the UE comprising a WUR and an MR, and the WUR class corresponding to a configuration characteristic of the WUR. The one or more processors may be configured to perform a wireless communication action based on the configuration characteristic of the WUR.

Some aspects described herein relate to a method of wireless communication performed by an apparatus of a UE. The method may include transmitting, to a network node, a class indication that indicates a WUR class associated with the UE, the UE comprising a WUR and an MR, and the WUR class corresponding to a configuration characteristic of the WUR. The method may include performing a wireless communication action based on the configuration characteristic of the WUR.

Some aspects described herein relate to a method of wireless communication performed by an apparatus of a network node. The method may include receiving, from a UE, a class indication that indicates a WUR class associated with the UE, the UE comprising a WUR and an MR, and the WUR class corresponding to a configuration characteristic of the WUR. The method may include performing a wireless communication action based on the configuration characteristic of the WUR.

Some aspects described herein relate to a non-transitory computer-readable medium that stores a set of instructions for wireless communication by a UE. The set of instructions, when executed by one or more processors of the UE, may cause the UE to transmit, to a network node, a class indication that indicates a WUR class associated with the UE, the UE comprising a WUR and an MR, and the WUR class corresponding to a configuration characteristic of the WUR. The set of instructions, when executed by one or more processors of the UE, may cause the UE to perform a wireless communication action based on the configuration characteristic of the WUR.

Some aspects described herein relate to a non-transitory computer-readable medium that stores a set of instructions for wireless communication by a network node. The set of instructions, when executed by one or more processors of the network node, may cause the network node to receive, from a UE, a class indication that indicates a WUR class associated with the UE, the UE comprising a WUR and an MR, and the WUR class corresponding to a configuration characteristic of the WUR. The set of instructions, when executed by one or more processors of the network node, may cause the network node to perform a wireless communication action based on the configuration characteristic of the WUR.

Some aspects described herein relate to an apparatus for wireless communication. The apparatus may include means for transmitting, to a network node, a class indication that indicates a WUR class associated with the apparatus, the apparatus comprising a WUR and an MR, and the WUR class corresponding to a configuration characteristic of the WUR. The apparatus may include means for performing a wireless communication action based on the configuration characteristic of the WUR.

Some aspects described herein relate to an apparatus for wireless communication. The apparatus may include means for receiving, from a UE, a class indication that indicates a WUR class associated with the UE, the UE comprising a WUR and an MR, and the WUR class corresponding to a configuration characteristic of the WUR. The apparatus may include means for performing a wireless communication action based on the configuration characteristic of the WUR.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example associated with wake up radio (WUR) operations, in accordance with the present disclosure.

DETAILED DESCRIPTION

Figure 1:
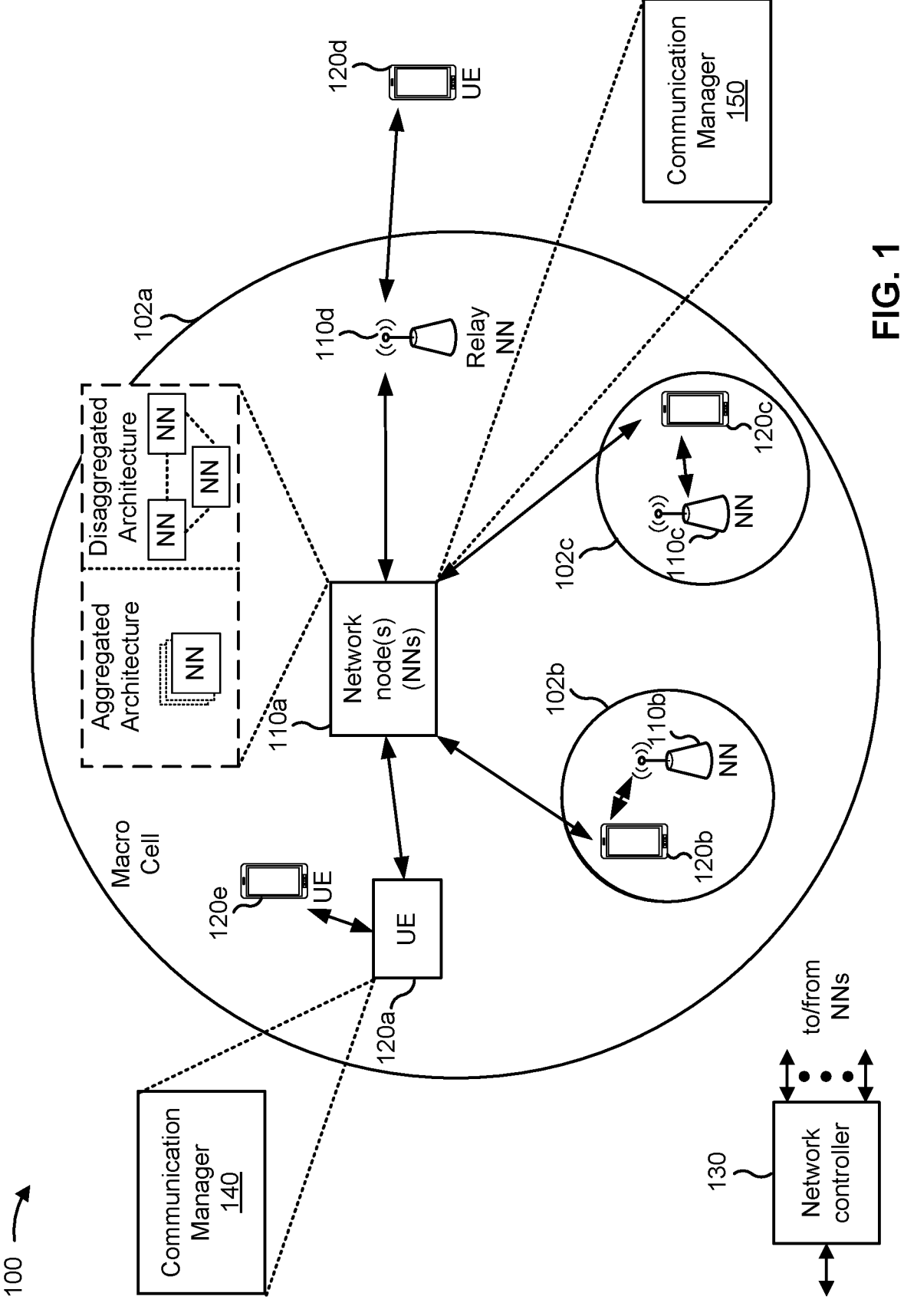
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells.

In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In some aspects, UEs may be classified according to different categories and/or may support different capabilities. For example, a network node may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category, and may be referred to as a reduced capacity (RedCap) UE (which may be interchangeably referred to as a reduced capability UE, also having the acronym "RedCap"), a low tier UE, and/or an NR-Lite UE, among other examples. A UE of the second category may be an ultra-reliable low-latency communication (URLLC) devices and/or an enhanced mobile broadband (eMBB) device and may have an advanced feature set compared to RedCap UEs. RedCap UEs may include wearable devices, Internet of Things (IoT) devices, sensors, cameras, and/or the like that are associated with a limited bandwidth, power capacity, and/or transmission range, among other examples. A UE of the second category may be referred to as a legacy UE, a baseline UE, a high tier UE, an NR UE, and/or a premium UE, among other examples. In some aspects, a RedCap UE may have capabilities that satisfy requirements of a first wireless communication standard but not a second wireless communication standard, while a UE of the second category may have capabilities that satisfy requirements of the second wireless communication standard (and also the first wireless communication standard, in some cases).

For example, a RedCap UE of the first category may support a lower maximum modulation and coding scheme (MCS) than a UE of the second category (e.g., quadrature phase shift keying (QPSK) or the like as compared to 256-quadrature amplitude modulation (QAM) or the like), may support a lower maximum transmit power than a UE of the second category, may have a less advanced beamforming capability than a UE of the second category (e.g., may not be capable of forming as many beams as a UE of the second category), may require a longer processing time than a UE of the second category, may include less hardware than a UE of the second category (e.g., fewer antennas, fewer transmit antennas, and/or fewer receive antennas), and/or may not be capable of communicating on as wide of a maximum bandwidth part as a UE of the second category, among other examples.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a network node, a class indication that indicates a wake up radio (WUR) class associated with the UE, the UE comprising a WUR and a main radio (MR), and the WUR class corresponding to a configuration characteristic of the WUR; and perform a wireless communication action based on the configuration characteristic of the WUR. Additionally, or alternatively, the communication manager 140 may perform one or more other operations described herein.

In some aspects, the network node 110 may include a communication manager 150. As described in more detail elsewhere herein, the communication manager 150 may receive, from a UE, a class indication that indicates a WUR class associated with the UE, the UE comprising a WUR and an MR, and the WUR class corresponding to a configuration characteristic of the WUR; and perform a wireless communication action based on the configuration characteristic of the WUR. Additionally, or alternatively, the communication manager 150 may perform one or more other operations described herein.

As indicated above, FIG. 1 is provided as an example. Other examples may differ from what is described with regard to FIG. 1.

Figure 2:
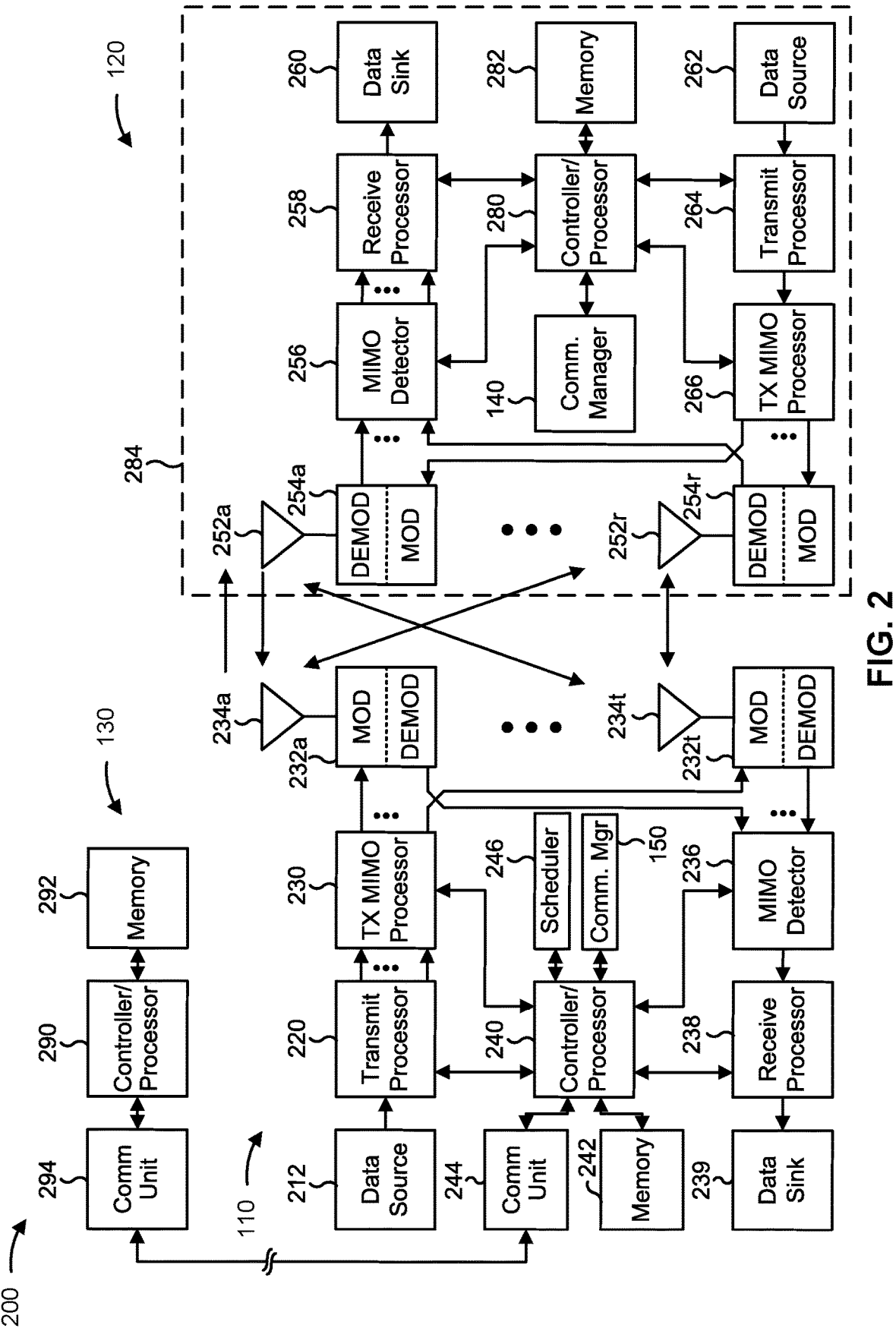
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a network node, such as for millimeter wave communications and/or the like. In such a case, the network node may provide the UE with a configuration of transmission configuration indicator (TCI) states that respectively indicate beams that may be used by the UE, such as for receiving a physical downlink shared channel (PDSCH). A TCI state indicates a spatial parameter for a communication.

For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. The network node may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a QCL type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-12).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, and/or any other component(s) of FIG. 2 may perform one or more techniques associated with WUR classification, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., the UE 120) includes means for transmitting, to a network node, a class indication that indicates a WUR class associated with the UE, the UE comprising a WUR and an MR, and the WUR class corresponding to a configuration characteristic of the WUR; and/or means for performing a wireless communication action based on the configuration characteristic of the WUR. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for receiving, from a UE, a class indication that indicates a WUR class associated with the UE, the UE comprising a WUR and an MR, and the WUR class corresponding to a configuration characteristic of the WUR; and/or means for performing a wireless communication action based on the configuration characteristic of the WUR. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN), also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
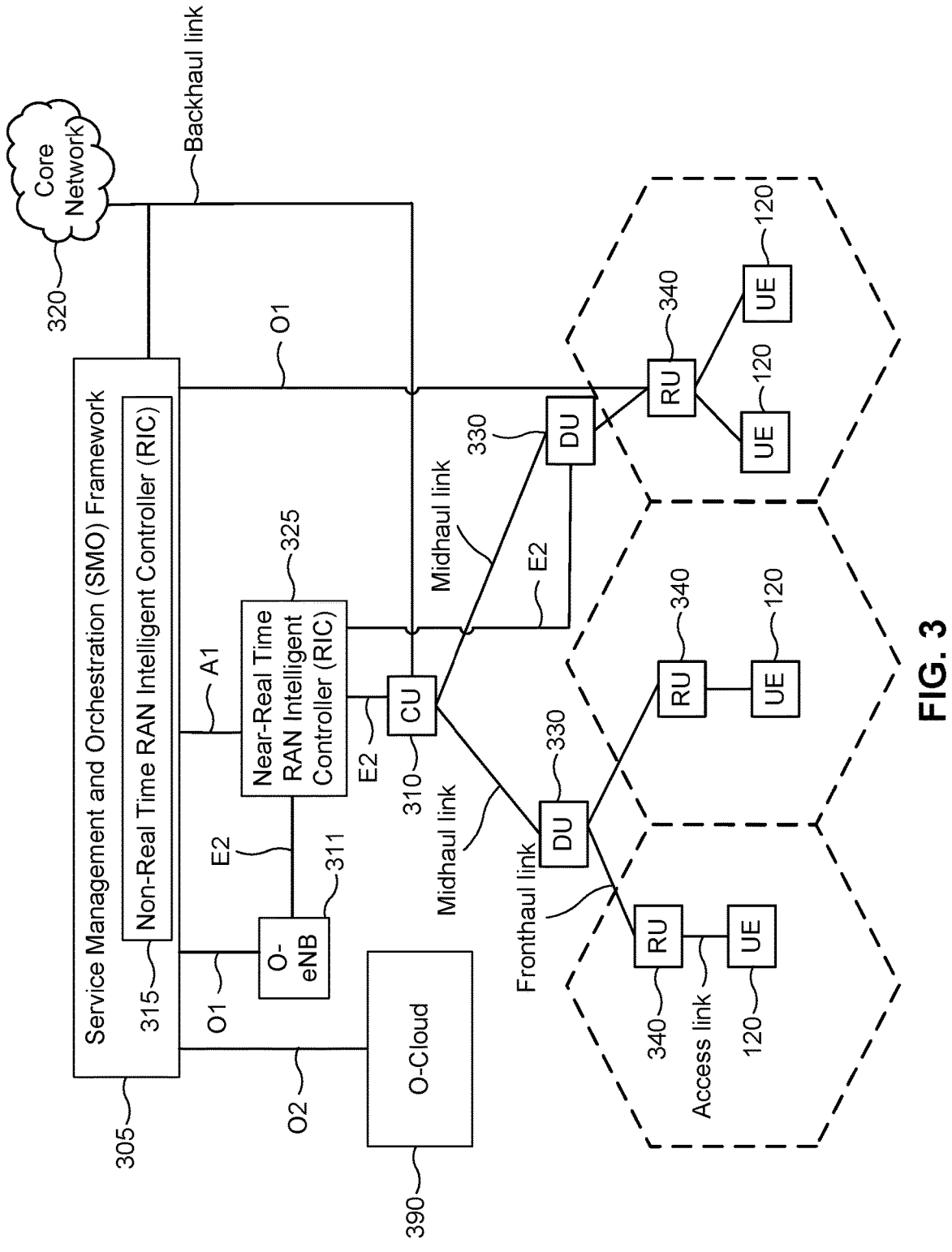
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC)

encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
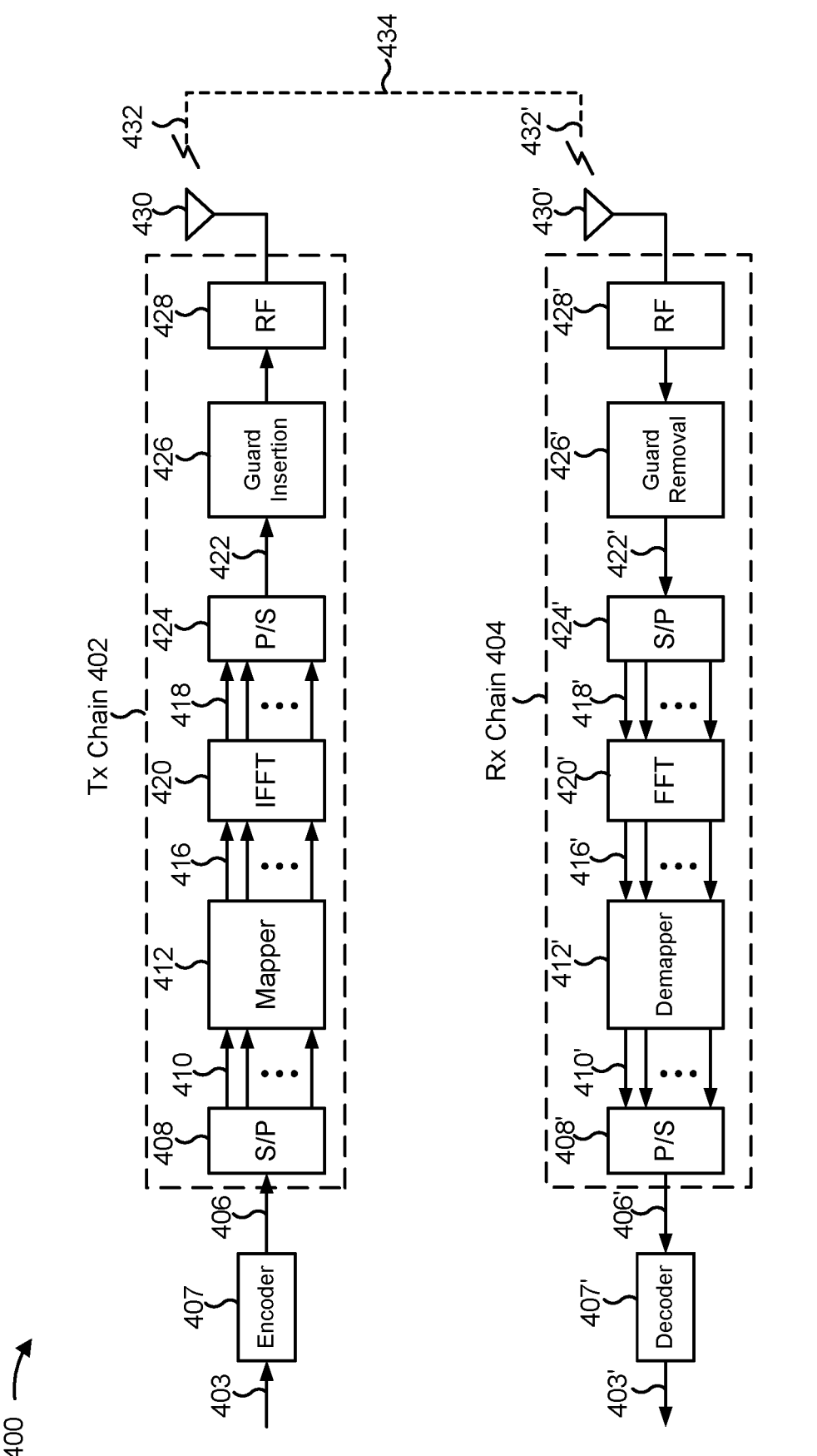
FIG. 4 is a diagram illustrating an example of a transmit (Tx) chain and a receive (Rx) chain of a UE, in accordance with the present disclosure.

FIG. 4 is a diagram illustrating an example 400 of a transmit (Tx) chain 402 and a receive (Rx) chain 404 of a UE 120, in accordance with the present disclosure. In some aspects, one or more components of Tx chain 402 may be implemented in transmit processor 264, TX MIMO processor 266, modem 254, and/or controller/processor 280, as described above in connection with FIG. 2. In some aspects, Tx chain 402 may be implemented in UE 120 for transmitting data 406 (e.g., uplink data, an uplink reference signal, and/or uplink control information) to a network node 110 on an uplink channel.

An encoder 407 may alter a signal (e.g., a bitstream) 403 into data 406. Data 406 to be transmitted is provided from encoder 407 as input to a serial-to-parallel (S/P) converter 408. In some aspects, S/P converter 408 may split the transmission data into N parallel data streams 410.

The N parallel data streams 410 may then be provided as input to a mapper 412. Mapper 412 may map the N parallel data streams 410 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 412 may output N parallel symbol streams 416, each symbol stream 416 corresponding to one of N orthogonal subcarriers of an inverse fast Fourier transform (IFFT) component 420. These N parallel symbol streams 416 are represented in the frequency domain and may be converted into N parallel time domain sample streams 418 by IFFT component 420.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 418 may be converted into an OFDM/OFDMA symbol stream 422 by a parallel-to-serial (P/S) converter 424. A guard insertion component 426 may insert a guard interval between successive OFDM/OFDMA symbols in the OFDM/OFDMA symbol stream 422. The output of guard insertion component 426 may then be upconverted to a desired transmit frequency band by a radio frequency (RF) front end 428. An antenna 430 may then transmit the resulting signal 432.

In some aspects, Rx chain 404 may utilize OFDM/OFDMA. In some aspects, one or more components of Rx chain 404 may be implemented in receive processor 258, MIMO detector 256, modem 254, and/or controller/processor sor 280, as described above in connection with FIG. 2. In some aspects, Rx chain 404 may be implemented in UE 120 for receiving data 406 (e.g., downlink data, a downlink reference signal, and/or downlink control information) from a network node 110 on a downlink channel.

A transmitted signal 432 is shown traveling over a wireless channel 434 from Tx chain 402 to Rx chain 404. When a signal 432' is received by an antenna 430', the received signal 432' may be downconverted to a baseband signal by an RF front end 428'. A guard removal component 426' may then remove the guard interval that was inserted between OFDM/OFDMA symbols by guard insertion component 426.

The output of guard removal component 426' may be provided to an S/P converter 424'. The output may include an OFDM/OFDMA symbol stream 422', and S/P converter 424' may divide the OFDM/OFDMA symbol stream 422' into N parallel time-domain symbol streams 418', each of which corresponds to one of the N orthogonal subcarriers. A fast Fourier transform (FFT) component 420' may convert the N parallel time-domain symbol streams 418' into the frequency domain and output N parallel frequency-domain symbol streams 416'.

A demapper 412' may perform the inverse of the symbol mapping operation that was performed by mapper 412, thereby outputting N parallel data streams 410'. A P/S converter 408' may combine the N parallel data streams 410' into a single data stream 406'. Ideally, data stream 406' corresponds to data 406 that was provided as input to Tx chain 402. Data stream 406' may be decoded into a decoded data stream 403' by decoder 407'.

Some UEs may have multiple transmit chains and/or multiple receive chains. For example, a UE may include a first radio component with a first transmit chain and a first receive chain and a second radio component with a second transmit chain and a second receive chain. In some examples, the first radio component and the second radio component may be separate (e.g., have separate transmit chains that do not share hardware components). In other examples, the first radio component and the second radio component may be conceptually separate (e.g., can be referred to as separate components and may have some separate hardware components, but may share one or more hardware components). In other words, in one example, a first radio component and a second radio component may share a common antenna 430, but may have separate mappers 412, IFFT components 420, or P/S converters 424, among other examples. In some examples, different radio components may have different configurations, such as different monitoring periodicities, different power levels, different processing capabilities, or different tuning bands, among other examples. Different terminologies may be used for radio components in a UE with a plurality of radio components. In some examples, the first (or second) radio component may be referred to as a "main radio," a "primary radio component" or a "main radio component" and the second (or first) radio component may be referred to as a "secondary radio component," a "wake up radio," a "wake-up radio component," or a "low-power wake-up radio component."

The number and arrangement of components shown in FIG. 4 are provided as an example. In practice, there may be additional components, fewer components, different components, or differently arranged components than those shown in FIG. 4. Furthermore, two or more components shown in FIG. 4 may be implemented within a single component, or a single component shown in FIG. 4 may be implemented as multiple, distributed components. Additionally, or alternatively, a set of components (e.g., one or more components) shown in FIG. 4 may perform one or more functions described as being performed by another set of components shown in FIG. 4.

Figure 5:
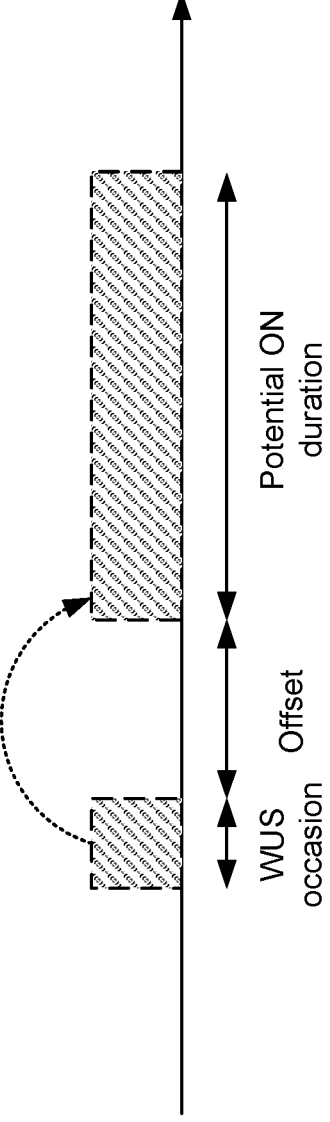
FIG. 5 is a diagram illustrating an example of wake up signaling, in accordance with the present disclosure.

FIG. 5 is a diagram illustrating an example 500 of wake up signaling, in accordance with the present disclosure.

As shown in FIG. 5, in a communication system, a network node and a UE may be configured with a wake up signal (WUS) occasion. During the wake up signal occasion, the network node may transmit a signal to the UE to trigger to the UE to transition from a reduced power mode (e.g., a discontinuous reception (DRX) off state) to another power mode (e.g., a normal power mode, such as a DRX on state associated with a DRX on duration). After transitioning from the reduced power mode to, for example, the normal power mode, the UE may have a period of time when the UE can communicate with the network node. For example, the UE may be configured with a DRX on duration. A start of the DRX on duration may be offset from the wake up signal occasion to provide time for the UE to process and interpret the wake up signal, complete a power mode transition, turn on one or more transmit chain components, or tune an antenna, among other examples.

A dual-radio UE may use a first radio component to monitor for wake up signals and a second radio component to communicate during an on duration. The first radio component may be a low-power wake up radio that is a companion receiver for the second radio component, which may be a main radio. The UE can have the main radio in a sleep state, thereby conserving a usage of power resources, while monitoring for wake up signals using the low-power wake up radio (e.g., which may consume less power resources to perform monitoring than the main radio consumes). When the UE detects a wake up signal with the first radio component, the UE can wake up the second radio component to communicate during the on duration, thereby providing improved communication performance (e.g., the main radio may have a higher transmit power and/or a greater processing capability than the low-power wake up radio, resulting in improved throughput and/or a reduced likelihood of dropped communications).

Additionally, by using a wake-up radio for wake up signaling monitoring, a UE can also perform more frequent wake up signal monitoring. For example, a network node can configure a UE with more frequent wake up signal occasions for monitoring using a low-power wake up radio without adversely impacting power resources than may be possible for monitoring using the main radio. In this case, a delay between data arriving at the network node and a wake up signal occasion occurring is reduced, thereby reducing a latency associated with communications relative to a UE with less frequent wake up signal occasions.

Low-power reference signals (LP-RSs) have been introduced for use with a low-power wake up radio. An LP-RS can be used for, for example, paging reception. Other reference signal functions, such as radio resource management or tracking, may be performed using other types of reference signals associated with the main radio, which, in some cases, the low-power wake up radio may have a computational capability for receiving. For the other types of reference signals, as well as other control information, there may be a latency associated with transmitting a wake up signal to a UE, the UE entering an on duration, and the UE receiving using the main radio. Different low power modes may be associated with different latencies. For example, a first low power mode may have a 6 millisecond (ms) latency for transitioning to an on duration, but a second, even lower power, mode may have a 20 ms or a 50 ms latency. Such even lower power modes may further reduce power consumption but, as described above, may result in increased latency to communicate some information.

A low-power (LP) signal may be any signal, such as one or more of the signals described herein, that may be received by a low-power radio component, such as one or more of the radio components described herein. For example, an LP signal may be a signal transmitted in a frequency band that an LP radio component is configured to monitor or a signal transmitted at a time that the LP radio component is configured to periodically monitor. An LP radio component may be configured to periodically monitor for an LP signal, such as an LP-WUS, a paging indicator, a LP synchronization signal (LP-SS), an LP synchronization preamble signal (LP-sync-preamble signal), or an LP-RS, in accordance with a schedule. For example, the LP radio component may monitor in accordance with a connected mode discontinuous reception (CDRX) cycle or in accordance with a configured period. The period may be configured by a network node (e.g., a serving cell of a UE). The LP-WUS may be an on-off keying (OOK) signal. The LP-WUS may be a sequence-based signal such as, for example, a DFT signal, a Gold signal, an amplitude shift keying (ASK) signal, a phase shift keying (PSK) signal, a pulse-position modulation (PPM) signal, a pulse-width modulation (PWM) signal, a pulse-amplitude modulation (PAM), a Walsh signal, an m-sequence signal, a Zadoff signal, and/or a Reed Solomon signal, among other examples. The LP-WUS may be a coded signal (e.g., PDCCH-based DCI). The LP-WUS may also be an OOK-based waveform signal. The waveform may be OFDM, modulating the time domain signal with low and high voltage signals. The LP-WUS or a paging indicator may schedule an LP-RS for the LP radio component to receive. The LP-RS may be any reference signal that may be measured by an LP radio component, for example a CSI-RS, a positioning reference signal (PRS), or a synchronization signal.

The LP-RS may be a sequence-based signal such as, for example, a DFT signal, a Gold signal, an ASK signal, a PSK signal, a PPM signal, a PWM signal, a PAM signal, a Walsh signal, an m-sequence signal, a Zadoff signal, and/or a Reed Solomon signal, among other examples. The LP-RS may also be an OOK-based waveform signal. The waveform may be OFDM, DFT-s-OFDM, signal carrier, or SC-QAM, modulating the time domain signal with different voltages. The LP-SS/LP-preamble-sync signal may be a sequence-based signal similar to SSB's PSS or SSB's SSS. The LP-SS may be a time domain sequence-based signal that modulates the time domain signal with a sequence. The LP-SS may be an OOK-based waveform signal. The waveform may be OFDM, modulating the time domain signal with low and high voltage signals.

As indicated above, FIG. 5 is provided as an example. Other examples may differ from what is described with respect to FIG. 5.

Figure 6:
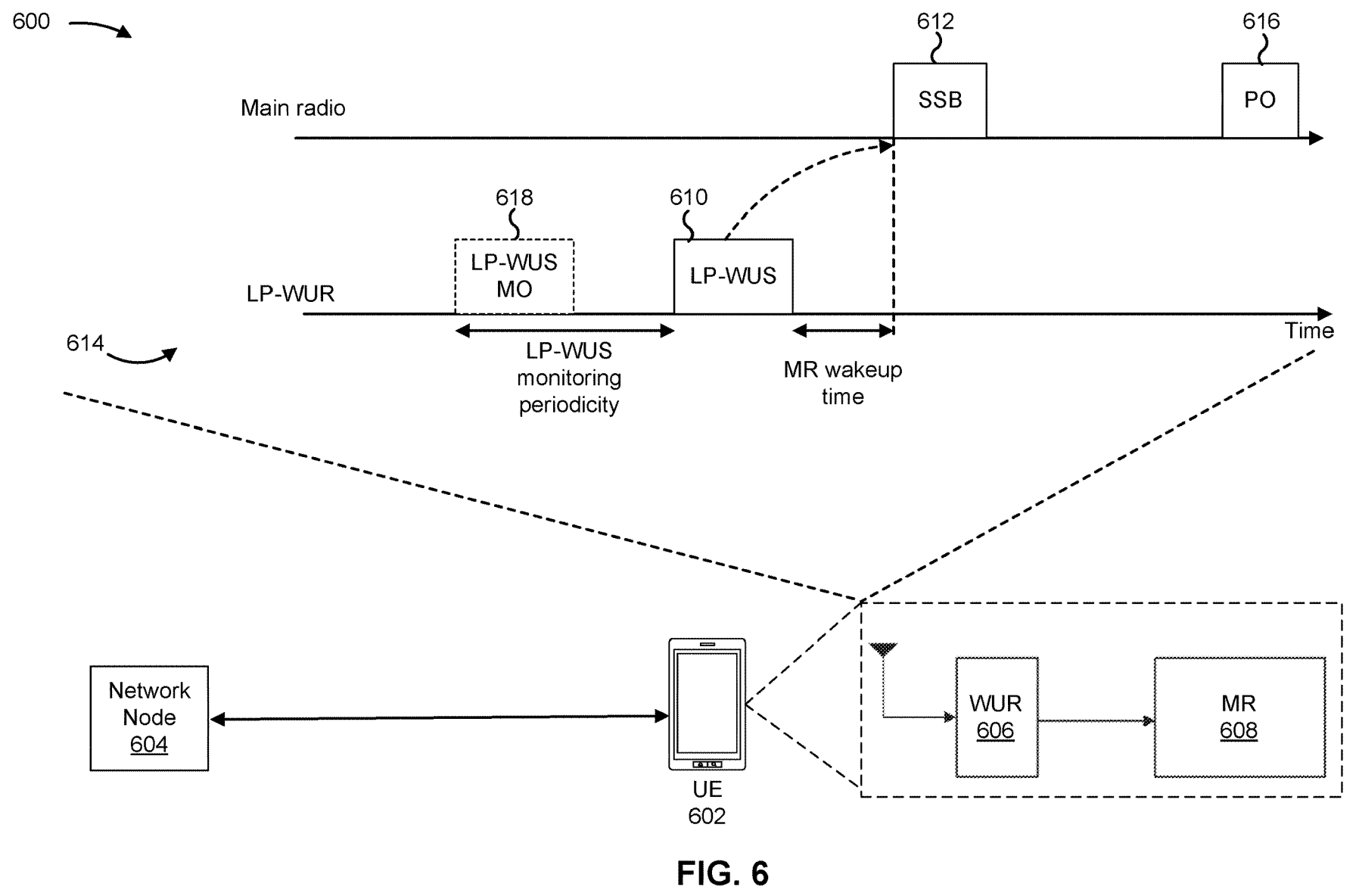

FIG. 6 is a diagram illustrating an example 600 associated with WUR operations, in accordance with the present disclosure. As shown, a UE 602 and a network node 604 may communicate with one another.

The UE 602 includes a WUR 606 and an MR 608. In some aspects, the WUR 606 and the MR 608 can each include at least one antenna and one or more integrated electronics, such as an amplifier, an analog-to-digital converter (ADC), a digital to analog converter (DAC), and/or another similar electronic device. In some aspects, the WUR

606 and the MR 608 can share one or more electronic devices (e.g., an amplifier, a filter, an integrated circuit (IC) configured for FFT or another similar type of operation, and/or another type of IC). In some aspects, the WUR 606 is a function of the MR 608. For example, the WUR 606 may be instantiated by deactivating one or more components of the MR 608. The WUR 606 is associated with a lower voltage and/or lower current than the MR 608. Accordingly, the WUR 606 can be associated with longer battery life for the UE 120 when the WUR 606 is used instead of the main radio 608.

In some cases, the WUR 606 can be configured to detect an LP-WUS 610 and/or an LP-SS but not perform other communications. The LP-WUS 610 can be a signal (e.g., a sequence of bits) configured to wake up the UE 602. The LP-WUS 610 can be configured to specifically wake up a main radio such as the main radio 608. The WUR 606 can have an operating power that does not exceed a threshold that is configured for WURs. Power may interchangeably refer to energy and vice-versa, herein. The main radio 608 can be configured to perform communications and can have a greater operating power than the WUR 606. When the UE 602 operates the WUR 606 and not the main radio 608, the UE 602 can conserve power in a sleep state and expend less power monitoring for an LP-WUS 610. When the LP-WUS 610 is detected, the UE 602 can wake up the main radio 608, which is able to perform other functions such as monitoring for physical downlink control channel (PDCCH) communications, a synchronization signal block (SSB) 612 and/or other communications, such as data communications. Sleeping may involve turning off a radio and one or more other components or functions of the UE 602. Turning off or switching off a radio may include removing power from the radio such that the radio is not fully operating or operating with full power. Waking up may involve turning on a radio and one or more other components or functions of the UE 602. Turning on or switching on a radio may include adding power to the radio such that the radio is fully operating or operating with full power.

The UE 602 can continuously monitor for an LP-WUS 610 with the WUR 606. In some cases, LP-WUS configurations can be used to reduce unnecessary UE 602 paging receptions. For example, an LP-WUS 610 can be transmitted only if there is paging for idle or inactive mode UEs. As shown by the schematic communication representation 614, if an LP-WUS 610 is detected, the main radio 608 can be turned ON, and the UE 602 can monitor SSB 612 before a paging occasion (PO) 616 for synchronization, and then receive a paging signal accordingly. If an LP-WUS 610 is not detected, the main radio 608 can stay in deep sleep mode for power saving.

In some cases, the LP-WUS 610 can carry a payload (e.g., addressing information) of more than one bit. For example, the LP-WUS 610 can be configured according to a packet-based design in which an LP-WUS packet include a preamble, a payload, and cyclic redundancy check (CRC). The payload can include a cell identifier (ID) for cell identification or UE addressing for paging early indication. In some cases, the LP-WUS 610 can be configured according to a sequence-based design, in which the LP-WUS 610 is formed using a predefined set of sequences dependent on cell ID and UE ID.

Further power efficiencies can be achieved by not keeping the WUR 606 always on for monitoring. For example, a WUR 606 duty cycle mode can be configured. In a WUR 606 duty cycle mode, the UE 602 can turn on the WUR 606 based on a given duty cycle and the network node 604 may only send an LP-WUS 610 within a WUR ON window that includes a set of LP-WUS monitoring occasions 618 for LP-WUS 610. The set of LP-WUS monitoring occasions 618 can be configured with an LP-WUS monitoring periodicity, as shown, that indicates a time difference between the start of one LP-WUS monitoring occasion and the start of the next (in time) LP-WUS monitoring occasion.

In some cases, however, oscillator drift in the UE 602 can lead to a timing mismatch for LP-WUS monitoring. Therefore, an LP-SS can be defined for WUR synchronization. LP-SS can have a longer periodicity than LP-WUS. In some cases, the timing uncertainty arising from the timing drift between LP-SS occasions can be less than one slot. In some cases, for example, the LP-SS can be an electromagnetic signal transmitted by a network (e.g., from a network node 604 that includes, or at least controls, an RU 340) and generated based at least in part on a sequence. For example, the network node 604 can use a Zadoff-Chu sequence, a sequence based on a waveform based on on-off keying (OOK) and/or frequency-shift keying (FSK), or another type of sequence to generate the LP-SS. In some cases, the usefulness of the LP-WUS may be dependent upon configuration of the WUR.

Some UEs 602 may perform radio resource management (RRM) measurements. The RRM measurements may be associated with an RRM configuration, as described in more detail herein. However, in some scenarios, it may be desirable to change RRM configuration. RRM relaxation has been introduced to allow for adjusting of an RRM configuration (or switching between RRM configurations). In RRM relaxation, a UE 120 may switch from measurement in accordance with a first set of parameters to measurement in accordance with a second set of parameters and/or to skipping one or more measurements entirely. Two examples of when RRM relaxation may be triggered are in scenarios where the UE 120 has low mobility and scenarios when the UE 602 is at a cell edge. One example for determining when the UE 602 is in a low mobility scenario is when $(\text{Srxlev}_{Ref} - \text{Srxlev}) < S_{SearchDeltaP}$ for a period of time $T_{SearchDeltaP}$. One example for determining when the UE 602 is at a cell edge is when $\text{Srxlev} \leq S_{SearchThresholdP}$ and/or $\text{Squal} \leq S_{SearchThresholdQ}$ (if a value for $S_{SearchThresholdQ}$ is configured). The network node 604 may configure the aforementioned example criteria (e.g., one or more of the criteria or another set of criteria) for the UE 602 to determine when to trigger RRM relaxation. In one scenario, when the UE 602 triggers RRM relaxation, the UE 602 may relax measurements (e.g., switch to an RRM relaxation configuration) for an interval associated with a scaling factor, as described in more detail in 3GPP Technical Specification (TS) 38.133. In a second scenario, when the UE 602 triggers RRM relaxation, the UE 120 may stop measurements (e.g., measurements associated with RRM or all measurements entirely) for up to a set period of time (e.g., 1 hour). The UE 602 may choose one or more of the aforementioned relaxation scenarios (or another relaxation scenario that is configured) based at least in part on different triggering criteria (e.g., whether a single triggering criterion is met, whether a plurality of triggering criteria are met, or which triggering criteria is/are met, among other examples). Additionally, or alternatively, the UE 602 may choose which measurements, among other parameters, to subject to the RRM relaxation, such as intra-frequency measurements, inter-frequency measurements (e.g., with a particular priority level), inter-RAT measurements, etc.

When a UE 602 operates in idle states (RRC-IDLE or RRC-INACTIVE) or connected states, the UE 602 may perform RRM measurement, cell re-selection (if triggered), and/or paging monitoring every I-DRX or C-DRX in idle/inactive or connected RRC state, respectively. The RRM measurements may include both serving cell and neighbor cell measurements. Whether the UE 602 is to perform neighbor cell measurements is determined by a serving cell status (e.g., neighbor cell RRM may starts when a serving cell channel quality does not satisfy one or more configured conditions). For the serving cell measurement, a UE 602 may measure a synchronization signal (SS) reference signal received (RSRP) (SS-RSRP) and an SS reference signal received quality (RSRQ) (SS-RSRQ) level of a serving cell and may evaluate a cell selection criterion S (which may be described in more detail in 3GPP TS 38.304) for the serving cell at least once every M1*N1 DRX cycle; where: M1=2 if an SS/PBCH block measurement timing configuration (SMTC) periodicity, TSMTC, is greater than 20 milliseconds and a DRX cycle is or equal to 0.64 seconds (otherwise M1=1). Additional details of the serving cell measurement are described in 3GPP TS 38.133. The value of N1 is different for different frequency bands (FR1 and FR2, as described herein). For FR1, N1 is equal to 1. Therefore, a UE 120 may perform serving cell measurement every 1 or 2 paging DRX cycles. Accordingly, the main power consumption for UEs in an idle or inactive state is from RRM measurement.

In 3GPP release 16 (Rel-16), the relaxing of RRM measurement for intra-frequency or inter-frequency/inter-RAT frequency measurement is allowed for UEs not at a cell edge and/or with low mobility. In 3GPP release 17 (Rel-17), additional relaxation measurement criteria are configured, such as for supporting stationary RedCap UEs. However, no relaxation may be configured for the serving cell RRM. This may be because the serving cell RSRP/RSRQ measurement may be more important than the aforementioned measurements and used to evaluate neighbor cell RRM relaxation.

When a WUR is introduced, one option is that the WUR monitors WUSs and RRM measurement is still done by an MR. However, the power saving gain may not be high since the MR may frequently wake up for the serving cell measurement. In such a scenario, the serving cell RRM can be a bottleneck for power saving since no relaxation is supported.

Another option is to relax serving cell RRM measurement or offload some RRM functionalities to the WUR. However, as described above, the relaxing of RRM measurements is configured for UEs at a cell edge or with low mobility. Accordingly, if such restrictions apply for the serving cell RRM relaxation, UEs away from a cell edge or not satisfying a low mobility criterion may have to frequently wake up the MR for RRM measurement. In this case, the power saving gain from WUR is limited. Therefore, offloading some RRM measurement functionality to WUR can be desirable.

In some cases, UEs can have different WUR configurations, as described in connection with FIG. 6. In some cases, different WURs can have different capabilities associated with signaling and/or other wireless communication tasks. Thus, configuring communications, at a network node, for UEs having WURs may not be effective for all configurations and associated capabilities. As a result, some communications may be inefficient and/or unsuccessful without taking into account the various configurations and associated capabilities of WURs.

Some aspects of the techniques and apparatuses described herein may provide for establishing WUR classifications. WUR classifications may be used to assign a WUR to a WUR class that may correspond to one or more configuration characteristics of the WUR. In some aspects, for example, a network node may send LP-WUS or PDCCH-based WUS to a UE or a set of UEs (e.g., based on a distance from the network node). If the network node is aware of capabilities of the UE and/or UEs (and their associated WURs), the network node may configure the LP-WUS and/or PDCCH-based WUS (or other signal such as LP-RS, LP-SS, and/or LP-sync-preamble signal). In some aspects, the UE may transmit (e.g., while in a connected mode or an unconnected mode), to the network node, a class indication that indicates a WUR class associated with the UE. The UE may use a WUR or an MR associated with the UE to transmit the class indication. In some aspects, the WUR may be indicated as part of a UE capability indication.

In some cases, the capabilities associated with WUR classes may be associated with different sets of capabilities or communication actions for each of a band, a band combination, a frequency range, a bandwidth part, a bandwidth combination, a component carrier, and/or a component carrier combination used by at least one of the WUR or the MR. In some aspects, capabilities associated with WUR classes and/or capabilities associated with UEs (which may include capabilities associated with WUR classes, or which may be separate capabilities) may include capabilities mentioned herein for each RRC state. For example, for each RRC state, a UE may have a different capability of using a respective signal type, monitoring a respective signal type, implementing a DRX associated with the MR, implementing a DRX associated with the WUR, performing RRM relaxation, performing respective types of RRM relaxation (e.g., inter-frequency RRM relaxation, intra-frequency RRM relaxation, and/or inter-RAT RRM relaxation, among other examples), offloading RRM measurements, implementing sets of possible configurations for RRM relaxation and/or RRM offloading (e.g., based on network configuration indications received using L1 signaling, L2 signaling, and/or L3 signaling associated with the WUR and/or the MR), implementing respective energy profiles at the UE associated with the WUR and/or the MR, and/or using a respective clock type or clock types (e.g., multiple clocks may be used, and a state and/or accuracy of each clock may be determined), among other examples. In some aspects, for example, different clocks may be used based on energy profiles at the UE associated with the WUR and/or the MR and/or based on network configurations received using L1 signaling, L2 signaling, and/or L3 signaling associated with the WUR and/or the MR. One or more of the RRC parameterization aspects described above may be applied to any number of different aspects of a UE, a WUR, a MR, and/or any functionality, capability, limitation, and/or configuration thereof.

In some aspects, to further optimize power consumption by the WUR, power information may be indicated to the network node. Power information may include, for example, a power consumption model associated with the WUR, an average power consumption associated with the WUR, and/or a power consumption per reference WUS signal (e.g., a WUS signal with a certain quantity of WUS resource elements (REs), bandwidth (BW), a quantity of symbols, and/or the like). The power information may be signaled by the UE as part of a WUR capability indication and/or determined based on a WUR class. For example, each class may be associated with a respective power model indicating the power consumption per allocation reference. The network node may use the power information to optimize the periodicity and/or duty cycle operation (e.g., DRX) of the WUR (e.g., WUR may have a corresponding DRX configuration). In some aspects, for example, the WUR may rely on energy harvesting and/or may be a very low power device and, accordingly, notifying the network node of the WUR class may facilitate optimization of the power resources.

In some aspects, indicating the WUR class may facilitate RRM Relaxation and/or RRM offloading, associated with serving cells and/or neighbor cells, from the MR to the WUR. The RRM relaxation and/or RRM offloading may be performed based on the WUR class. In some aspects the RRM relaxation and/or offloading may be further based on at least one of a band, a band combination, a frequency range, a bandwidth part, a bandwidth combination, a component carrier, or a component carrier combination. The RRM relaxation and/or offloading may be associated with usage of the WUR, usage of the WUR and/or the MR where the UE is operating as an energy harvesting device, a very low power device (e.g., based on a threshold), with a low charging rate (e.g., based on a threshold), and/or according to an energy state.

In some aspects, the RRM relaxation and/or offloading may be associated with an energy profile of the MR, which may include at least one of a charging rate profile (e.g., a current measured charging rate and an expected/predicted charging rate over time), a discharging rate profile (e.g., a current measured discharging rate and an expected/predicted discharging rate over time), and/or an energy state profile (e.g., a current measured energy state and expected/predicted energy state over time). In some aspects, the RRM relaxation and/or offloading may be associated with a function of one or more of the above metrics and/or any number of other metrics. The function may be defined in a wireless communication standard and/or configured through Layer 1 (L1) signaling, Layer 2 (L2) signaling, and/or Layer 3 (L3) signaling. The function may be used to determine whether to perform serving cell RRM relaxation, a certain type of RRM relaxation for a serving cell, non-serving cell RRM relaxation, and/or a certain type of RRM (e.g., inter-frequency RRM or intra-frequency RRM) relaxation for serving cell. For example, if the UE is only operating (e.g., receiving and/or transmitting data) during periodic times, e.g., every 30 min or every hour, then the UE might relax RRM measurements accordingly.

In some aspects, a WUR class may correspond to an operating configuration of a WUR and/or MR. For example, a WUR may be a passive radio frequency identification (RFID) tag (e.g., zero power device) radio. In some aspects, the MR may be a semi-passive RFID (e.g., a zero-power device with an energy storage unit or a semi-passive IoT) tag (e.g., a passive RFID tag radio with an energy storage unit). The WUR may be a function of the MR such as, for example, an operating state in which the MR uses power from an RF signal and not from an energy storage unit. In some aspects, a WUR may be a passive RFID tag radio configured to use a limited amount of energy from an energy storage unit. In some aspects, the WUR may use RF energy harvesting, solar energy harvesting, thermal energy harvesting, light energy harvesting, and/or laser energy harvesting. In some aspects, the WUR may be a semi-active RFID tag radio that includes one or more active RF components such as, for example, a low noise amplifier (LNA) and/or a power amplifier (PA), among other examples. In some aspects, the WUR may be an active RFID tag radio (e.g., semi-active RFID tag radio with a capability to generate waveforms and/or signals) that includes one or more active RF components and that may include hardware, firmware, software, and/or RF components used to generate waveforms and/or signals. In some aspects, the MR may be a semi-active RFID tag radio, an active RFID tag radio, and/or an energy harvesting device, similar to an NB-IOT device and/or an NR legacy UE with energy harvesting capabilities.

In some aspects, the WUR may share active RF components with the MR and/or may access an energy storage unit (e.g., a battery) as well. For example, the MR may include some hardware components that may be activated and/or deactivated. When the MR is operating as a WUR, the deactivated components may be, for example, components responsible for processing OFDM signals (e.g., DFT blocks) and/or performing polar decoding, among other examples. In some aspects, the MR may be a semi-passive RFID tag radio while the WUR may be a passive RFID tag radio aspect (e.g., the WUR may not be able to access the storage unit of the semi-passive RFID tag radio). In some aspects, the MR may be a passive or semi-passive RFID tag radio with both transmission and reception capabilities while the WUR may just use the reception function of the MR. In some aspects, the MR may be a semi-active RFID tag radio (e.g., a semi-passive RFID tag radio with one or more RF active components) while the WUR may be configured to utilize the semi-passive and/or passive aspect of the MR. In some aspects, based on an energy profile of the WUR, the network node may transmit a PDCCH-based WUS and/or an LP-WUS. Similarly, the network node may transmit reference signals or synchronization signals of different types (e.g., sequence based reference signals versus OOK reference signals) based on different energy profiles.

In some aspects, an energy profile may be reported from the MR when it is ON (activated) in a connected state, an inactive state, and/or an idle RRC state, or by the WUR if it has a transmission component (e.g., by backscattering using an RFID tag radio) and/or during transmission allocations dedicated to WUR. In some aspects, the UE may transmit an energy profile and a set of statistics about the energy profile (e.g., statistics associated with a charging profile, a discharging profile, and/or an energy state profile) to facilitate prediction, by the network node, of energy consumption at the UE. In some aspects, the network node may transmit energy to the UE (e.g., RF energy), and the UE may use the RF signal (or another RF signal) to power the WUR and receive commands, queries, data, and/or control information from the network node. The acquired power may be used (e.g., using backscattering) to power the WUR to facilitate transmitting information to the network node.

In some aspects, based on a WUR class indicating whether the WUR is partially or fully separate from the MR, the switching time associated with switching from MR operations to WUR operations may be different. In some aspects, the switching time associated with switching from WUR operations to MR operations may be configured, preconfigured, and/or specified in a wireless communications standard and may be associated with a WUR class and/or whether the WUR is subset of the MR. In some aspects, switching time may be indicated to the network node by the UE regardless of whether the WUR is a subset of the MR.

In some aspects, clock information and/or accuracy may be associated with a WUR class. In some aspects, a clock information may indicate which clocks are used at which time, RRC state, and/or sleep mode at the MR of the UE. The UE may indicate the type of the clock used by the WUR. In some aspects, clock accuracy may include, for example, a first quantity that indicates a clock frequency drift and/or a second quantity that indicates a clock maximum frequency error. In some aspects, a WUR class may be associated with a quantity (e.g., the first quantity or the second quantity), a range associated with a quantity (e.g., a minimum value of a quantity and/or a maximum value of the quantity), and/or statistics associated with a quantity (e.g., a mean and/or a variance). In some aspects, the WUR may include multiple clocks that may be used at different times, in association with different RRC states, in association with different sleeping modes of the MR, and/or in association with different energy profiles of the MR and/or the WUR. For example, the WUR may include multiple energy and/or power states and certain energy profile and may change from using one clock to another clock based on a change in the energy and/or power state. In some aspects, the network node, based on clock accuracy and/or power consumption of the WUR (e.g., as determined based on the WUR class and/or L1/L2/L3 indications), the may configure an LP-SS configuration (e.g., periodicity, time/frequency configuration, and/or repetition) and/or an LP-sync-signal configuration (e.g., whether the LP-sync-signal is on, the periodicity, the time/frequency configuration, and/or repetition).

In some aspects, based on classification of the WUR, the underlying MR type may be revealed. For example, a WUR class A may be associated with a legacy UE, a WUR class B may be associated with a RedCap UE, a WUR class C may be associated with an enhanced RedCap (eRedCap) UE, a WUR class D may be associated with IoT, and/or a WUR class E may be associated with a passive IoT, among other examples. In some aspects, waking up and/or maintaining a sleep state may be based on a UE type (and thus, associated with a WUR type). For example, in some aspects, a legacy UE may use no DRX or a dense DRX ON/active time cycle, while a RedCap UE may have more OFF duration (e.g., the OFF duration of DRX may be larger than the ON duration), and a passive IoT have wake up to monitor data or measure a channel every 10 min. In some aspects, a wireless communication standard may define a pre-configuration of a DRX configuration for WUR and/or MR based on the WUR class, which may be associated with a UE type. In some aspects, WUR class may be irrelevant to UE type and a DRX configuration for each WUR class may be defined separately, specified by a wireless communication standard, preconfigured during manufacturing, and/or configured by a network node (e.g., using L1 signaling, L2 signaling, and/or L3 signaling).

As indicated above, FIG. 6 is provided as an example. Other examples may differ from what is described with regard to FIG. 6.

Figure 7:
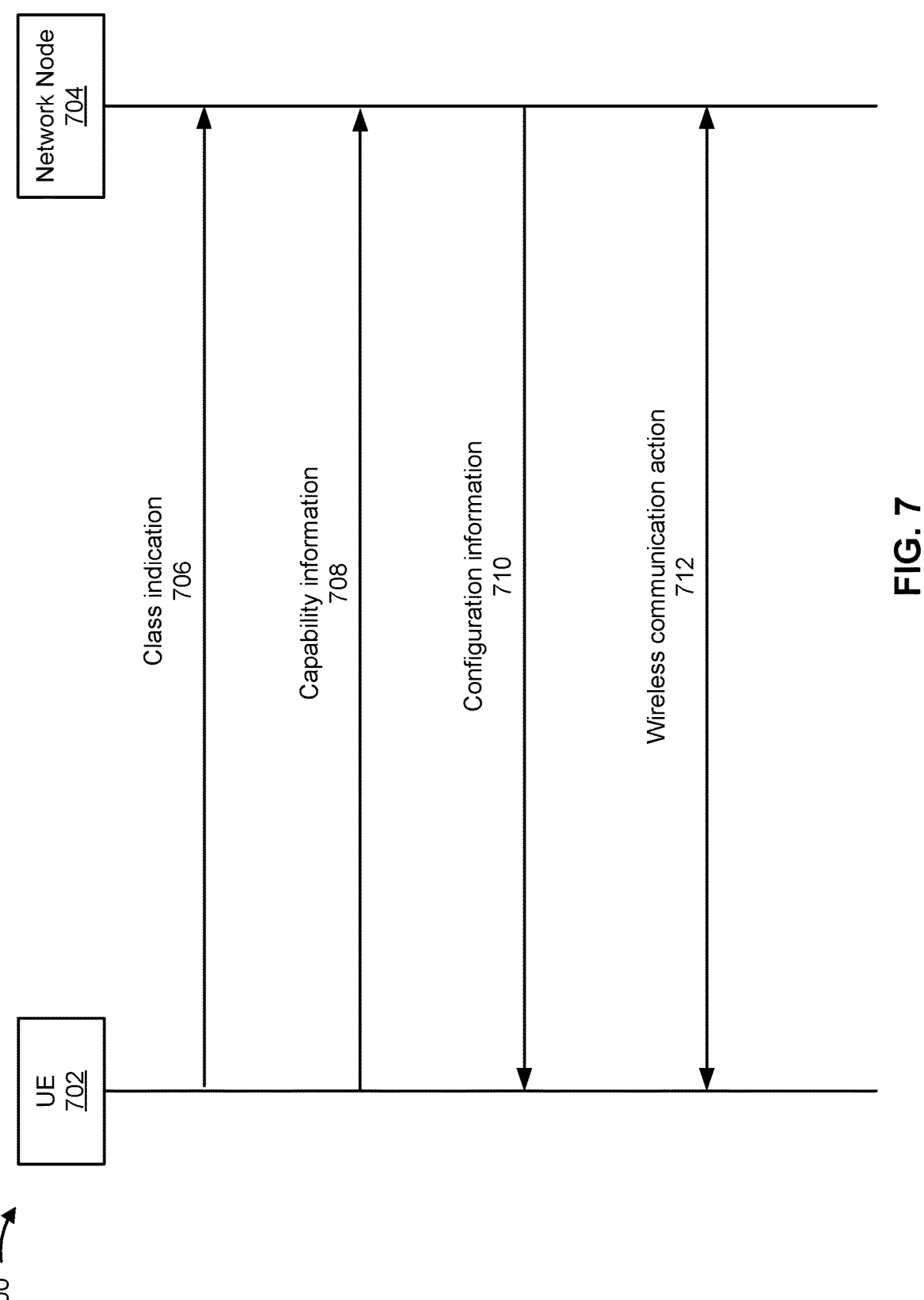
FIG. 7 is a diagram illustrating an example associated with WUR classification, in accordance with the present disclosure.

FIG. 7 is a diagram illustrating an example 700 associated with WUR classification, in accordance with the present disclosure. As shown, a UE 702 and a network node 704 may communicate with one another. In some aspects, the UE 702 may be, be similar to, include, or be included in, the UE 602 depicted in FIG. 6 and/or the UE 120 depicted in FIGS. 1-3. In some aspects, the network node 704 may be, be similar to, include, or be included in, the network node 604 depicted in FIG. 6, one or more components of the disaggregated base station architecture 300 depicted in FIG. 3, and/or the network node 110 depicted in FIGS. 1 and 2. The UE 702 may include a WUR and an MR.

As shown by reference number 706, the UE 702 may transmit, and the network node 704 may receive, a class indication. The class indication may indicate a WUR class associated with the UE 702. The UE 702 may transmit the class indication using the WUR. In some aspects, where the MR is different than the WUR, the UE 702 may transmit the class indication using the MR.

In some aspects, the WUR class may correspond to a configuration characteristic of the WUR. The configuration characteristic and/or any related capability may correspond to a band, a band combination, a frequency range, a bandwidth part, a bandwidth combination, a component carrier, and/or a component carrier combination. In some aspects, the configuration characteristic may correspond to a UE capability. The UE capability may include a capability for decoding PDCCH based control signals, a capability for detecting OOK based control signals, a capability for decoding OOK based control signals, a capability for decoding sequence based control signals, a capability for detecting OFDM based reference signals, a capability for detecting OOK based reference signals, and/or a capability for detecting sequence based reference signals, among other examples. In some aspects, the configuration characteristic may correspond to power consumption information. In some aspects, the configuration characteristic may correspond to a hardware, firmware, and/or software configuration associated with the WUR. In some aspects, the configuration characteristic may correspond any number of wireless communication capabilities, configurations, and/or limitations.

In some aspects, for example, the class indication may be indicative of capability information. The capability information may indicate power consumption information. The power consumption information may indicate at least one of a power consumption model, an average power consumption, or a power consumption associated with a reference wake up signal. The configuration characteristic may correspond to the power consumption information. In some aspects, for example, the WUR may include a function of the MR, the function corresponding to a semi-passive RFID tag radio operation. The configuration characteristic may correspond to at least one of a radio frequency energy harvesting operation, a solar energy harvesting operation, a thermal energy harvesting operation, a light energy harvesting operation, or a laser energy harvesting operation. In some aspects, the WUR may include a semi-active RFID tag radio. In some aspects, the WUR may include at least one component of the MR. The UE may include, for example, a hybrid radio that includes the WUR and the MR.

In some aspects, the configuration characteristic may include an energy profile of the WUR. The energy profile may be used to determine signal types that are to be transmitted to the UE 702. In some aspects, the UE 702 may separately transmit energy profile information corresponding to the energy profile. In some aspects, a WUR class indication and/or an energy profile may be transmitted using any number of different types of signaling. For example, the UE 702 may transmit the WUR class indication and/or an energy profile using L1 signaling, L2 signaling, L3 signaling, a unified air interface (UAI), user capability enquiry signaling, and/or multiplexed with an L1 signal, L2 signal, and/or L3 signal such as, for example, a CSI-RS, a HARQ-ACK, a scheduling request (SR), a buffer status report (BSR), and/or a random access channel (RACH) message, among other examples.

In some aspects, the configuration characteristic may correspond to a degree of integration between the WUR and the MR, and an operating parameter, which may be based on the WUR class, may include a switching time associated with switching operation between the WUR and the MR. The operating parameter may include clock information and/or a clock accuracy. In some aspects, for example, the UE 702 may receive, based on the clock accuracy and the configuration characteristic, a low power signal configuration.

In some aspects, the operating parameter may include at least one of a value, a range of values, or a statistic associated with a value. In some aspects, the UE 702 may transmit, to the network node 704, an indication of a switching time associated with switching operation between the WUR and the MR. In some aspects, the indication of the switching time may be included in the class indication. In some aspects, the WUR class may be associated with an MR type.

As shown by reference number 708, the UE 702 may transmit, and the network node 704 may receive, capability information. In some aspects, the capability information may be transmitted as part of and/or along with the class indication. In some aspects, the class indication may be indicative of the capability information. As shown by reference number 710, the network node 704 may transmit, and the UE 702 may receive, configuration information. The configuration information may include a configuration for performing a wireless communication action. In some aspects, for example, the configuration information may indicate an LP monitoring configuration. In some aspects, the configuration information may include an RRM relaxation and/or offloading configuration.

As shown by reference number 712, the UE 702 and/or the network node 704 may perform a wireless communication action. The wireless communication action may be based on the WUR class. In some aspects, performing the wireless communication action includes performing the wireless communication action based on a band, a band combination, a frequency range, a bandwidth part, a bandwidth combination, a component carrier, and/or a component carrier combination In some aspects, the wireless communication action is a class-based RRM operation. In some aspects, capability and/or the class-based RRM operation may be based on at least one of a frequency range, a frequency band, or a frequency band combination. In some aspects, performing the class-based RRM operation may include at least one of performing a relaxed RRM operation or offloading one or more RRM operations from the WUR to the MR. In some aspects, performing the class-based RRM operation may include performing the class-based RRM operation associated with at least one of a serving cell or a non-serving cell.

In some aspects, the UE 702 and/or network node 704 may perform the class-based RRM operation during a WUR usage period. The WUR usage period may correspond to at least one of an energy harvesting operation or a low power operation. In some aspects, the UE 702 and/or network node 704 may perform, using the MR, the class-based RRM operation during an energy harvesting operation, where using the MR includes using the MR based on at least one of a low charging rate, a low energy state, or a high discharging rate. In some aspects, the UE 702 and/or network node 704 may perform the class-based RRM operation during an MR usage period and based on at least one of an energy profile associated with the MR or an energy profile associated with the WUR. For example, in some aspects, the UE 702 may select or use certain configurations based on power profiles and/or energy profiles. In some aspects, the energy profile may include at least one of a charging rate profile, a discharging rate profile, an energy state profile, or an energy profile function. In some aspects, the UE 702 and/or network node 704 may perform the class-based RRM operation based on a periodic operating cycle. The WUR may include a passive RFID tag radio and, in some examples, the UE 702 may use an amount of energy from an energy storage unit that satisfies an energy threshold.

In some aspects, the UE 702 and/or network node 704 may perform the wireless communication action by performing an inter-frequency SSB monitoring operation associated with a serving cell, an intra-frequency SSB monitoring operation associated with a serving cell, an inter-frequency SSB monitoring operation associated with a neighbor cell, an intra-frequency SSB monitoring operation associated with a neighbor cell, an inter-frequency RRM operation associated with a serving cell, an intra-frequency RRM operation associated with a serving cell, an inter-frequency RRM operation associated with a neighbor cell, and/or an intra-frequency RRM operation associated with a neighbor cell.

In some aspects, an operating parameter associated with the wireless communication action may be based on the WUR class. The operating parameter may include an expected synchronization time, a minimum periodicity of a synchronization signal, a paging frequency, a modem power associated with a sleep state, a modem power associated with a wake up signal reception state, a power profile of the WUR, a power state, a power consumption associated with a power state, a wake up time based on a wake up indication, and/or a restriction associated with a restricted wake up time. In some aspects, the UE 702 and/or network node 704 may perform the wireless communication action based on a WUR DRX configuration, and the WUR DRX configuration may be based on the WUR class. In some aspects, the WUR class may correspond to a UE type. In some aspects, the UE 702 and/or network node 704 may perform the wireless communication action based on an MR DRX configuration, and the MR DRX configuration may be based on at least one of the WUR class or a UE class.

As indicated above, FIG. 7 is provided as an example. Other examples may differ from what is described with regard to FIG. 7.

Figure 8A:
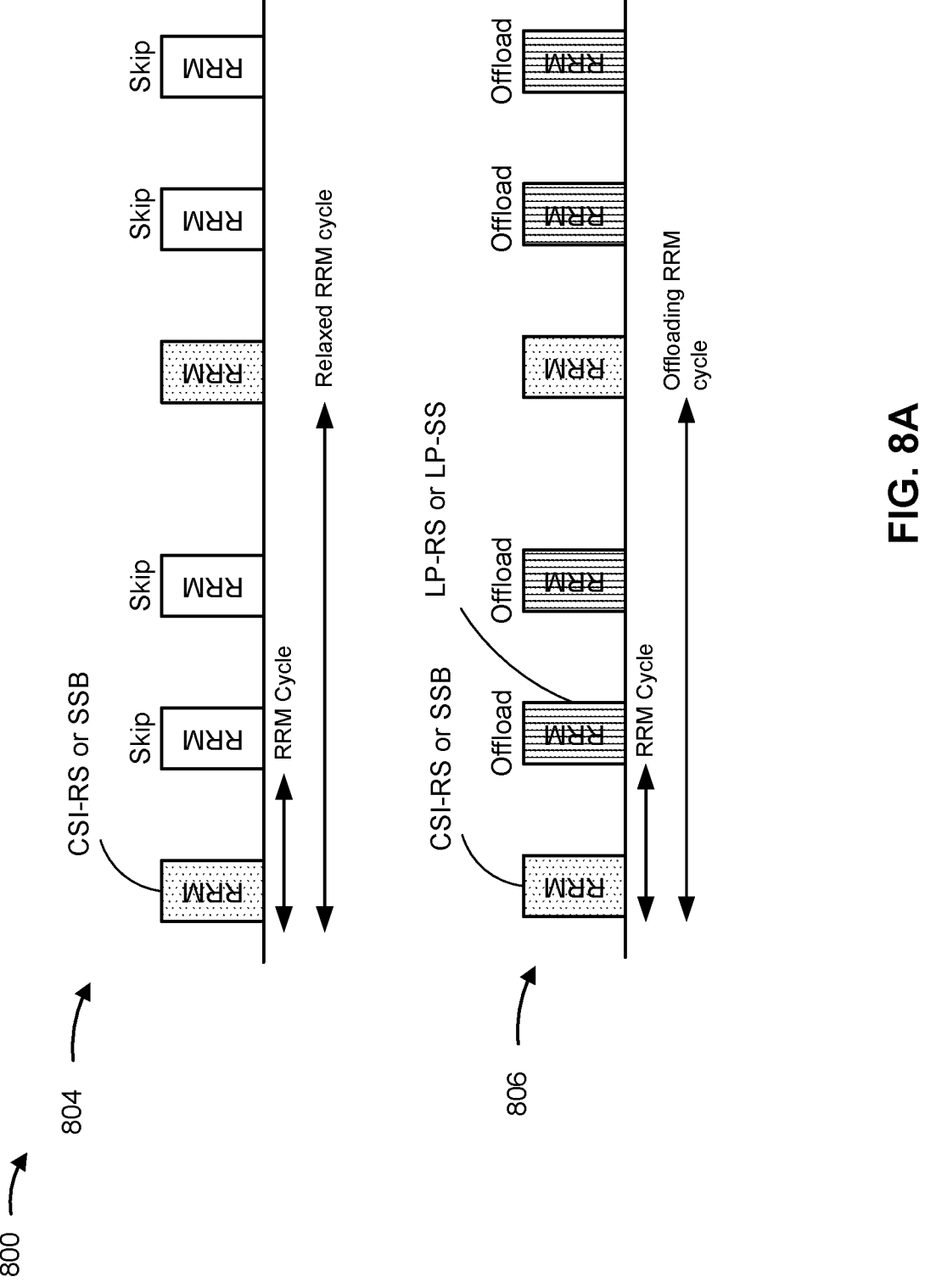
FIGS. 8A and 8B are diagrams illustrating examples associated with WUR assisted communication, in accordance with the present disclosure.
Figure 8B:
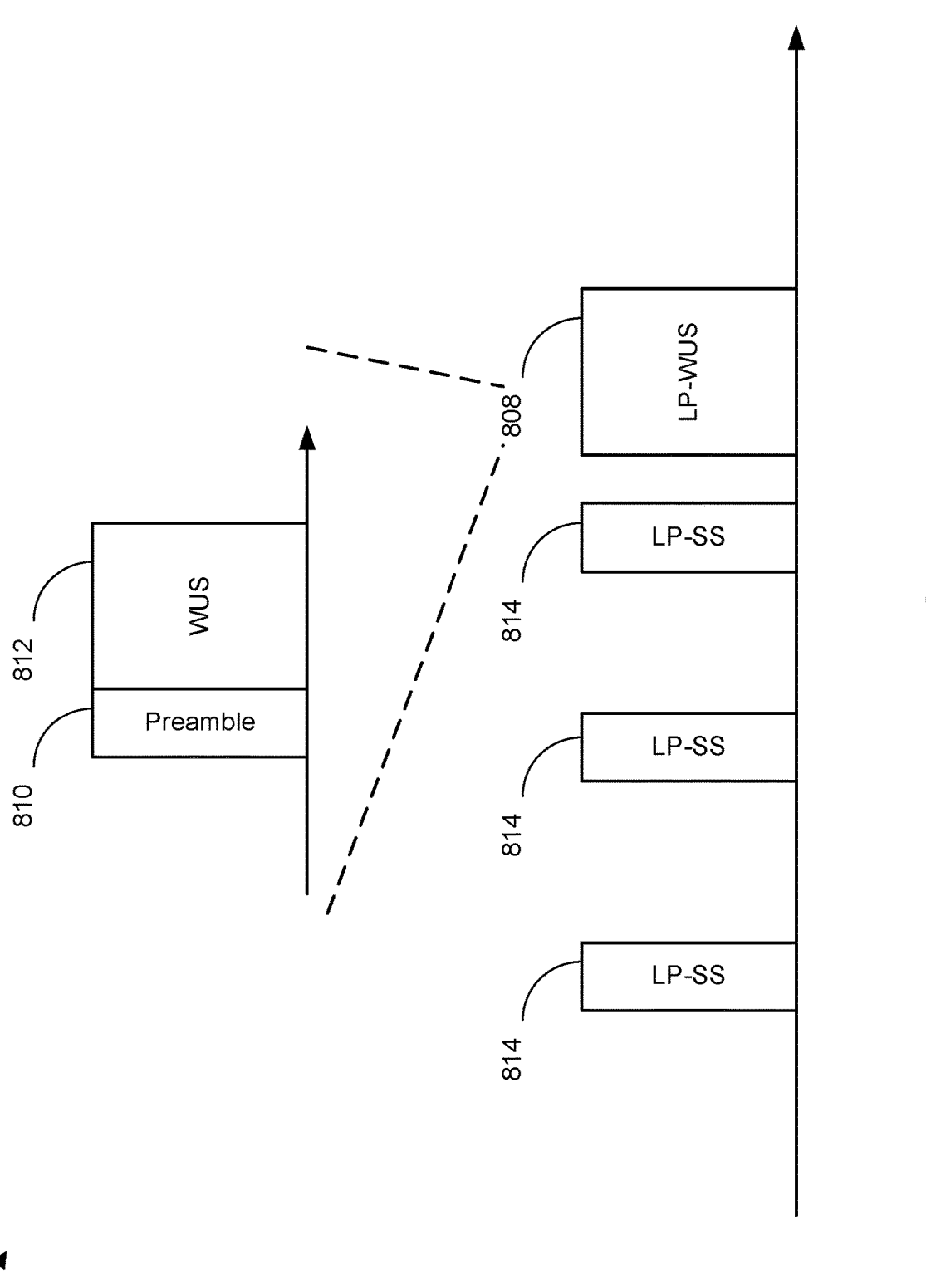

FIGS. 8A and 8B are diagrams illustrating examples 800 and 802 associated with wake up radio assisted communication, in accordance with the present disclosure.

In some aspects, a UE (e.g., the UE 702) may monitor for signaling relating to RRM based on a WUR class. For example, the UE may perform an RRM relaxation procedure for an inter-frequency or intra-frequency serving cell for a serving cell or one of a set of non-serving cells. In RRM relaxation, the UE may be enabled to skip (e.g., not measure or process) one or more signals in one or more RRM occasions during a particular interval of time. In some aspects, the UE may be configured with one or more configurations for RRM relaxation (e.g., which may reduce RRM measurement intervals or times or may stop RRM measurements for a configured time duration). For example, the UE may receive a set of configurations when the second radio component is on (e.g., during connected mode or during inactive or idle mode when the UE has a capability of receiving configuration during inactive or idle mode). In this case, during an update occasion, the UE may receive, as a signal of the one or more signals, a set of transmissions for RRM measurement or an indication of which RRM configuration of the set of RRM configurations the UE is to follow. The UE may monitor for the one or more signals in accordance with an RRM configuration. For example, the UE may skip one or more reception opportunities in accordance with a current RRM configuration. The UE may perform a serving cell or neighbor cell measurement using the first radio component or, after the second radio component is transitioned to an off duration, using the second radio component. In some aspects, the UE may update, configure, or re-configure an RRM measurement configuration of a serving cell or neighbor cell using the wake up signal or the one or more signals occurring during the offset period.

In some aspects, the UE may be configured with a first RRM relaxation configuration with a first set of parameters and a second RRM relaxation configuration with a second set of parameters. The sets of parameters may differ with regard to a periodicity of measurements (which may be referred to as a "relaxation factor"), an offloading factor (when RRM offloading, as described herein, is also configured). As another example, the sets of parameters may differ with regard to one or more thresholds or conditions for RRM. For example, an RRM configuration may have a threshold associated with performing RRM procedures that is a first threshold when an RRM measurement is being performed by the first radio component and a second threshold when the RRM measurement is being performed by the second radio component. Additionally, or alternatively, a threshold may be specific to a type of signal. For example, the UE may have a different thresholds for an RRM procedure associated with RRM based at least in part on whether the UE is measuring an LP-RS, an LP-SS, a CSI-RS, or an SSB, among other examples, as described in more details herein. Additionally, or alternatively, an RRM configuration threshold may be at least a function of an energy profile associated with at least one of the WUR or the MR. In some aspects, for example, if a charging rate associated with a WUR satisfies a first threshold, an RRM measurement condition and/or threshold may have a first value, while if the charging rate satisfies a second threshold, the RRM measurement condition and/or threshold may have a second value. In some aspects, for example, if a discharging rate associated with a WUR satisfies a first threshold, an RRM measurement condition and/or threshold may have a first value, while if the discharging rate satisfies a second threshold, the RRM measurement condition and/or threshold may have a second value. Similarly, in some aspects, for example, if an energy state associated with a WUR satisfies a first threshold, an RRM measurement condition and/or threshold may have a first value, while if the energy state satisfies a second threshold, the RRM measurement condition and/or threshold may have a second value.

In some aspects, an energy profile associated with a WUR and/or a MR, in combination with any number of other metrics, may be used to determine RRM measurements and/or conditions. In some aspects, the energy profile and/or other metrics may be based on a wireless communication standard and/or signaling (e.g., RRC signaling, L1 signaling, L2 signaling, L3 signaling, and/or user assistance information, among other examples). In some aspects, the other metrics may include, for example, a capability of a WUR (e.g., an access link transmission capability), a capability associated with a WUR class, and/or a capability of a MR, among other examples.

In some aspects, the UE may receive, via the first radio component as part of the one or more signals or the wake up signal, information selecting or changing a configured RRM configuration. Additionally, or alternatively, the UE may receive, via the second radio component when available (e.g., in an on duration), information selecting, changing, or configuring an RRM configuration. For example, the UE may receive an indicator of an index value that corresponds to an RRM configuration and the UE may adopt the indicated RRM configuration. In some aspects, the UE may receive a stop RRM measurement indication for a certain time duration, wherein time duration can be statically configured or configured by a network node (e.g., the network node 704). The configuration (e.g. of the time duration) may be performed using the first or second radio component. Alternatively, the configuration may be performed using an LP-WUS or an update occasion. In some aspects, the UE may receive an indication of relaxation or offloading of RRM of one or more type (e.g., inter-frequency or inter-frequency or inter-RAT) for one or more of serving or one or more of non-serving cells. In some aspects, the UE may associate different RRM configurations and/or parameters thereof with different cells. For example, the UE may associate a first RRM configuration (e.g., with a first relaxation factor or offloading factor) with a serving cell and a second RRM configuration (e.g., with a second relaxation factor or offloading factor) with a non-serving cell. Additionally, or alternatively, the UE may associate RRM configurations by RRM (e.g., inter-frequency or intra-frequency).

In some aspects, the RRM signaling may be applicable to the WUR, the MR, or both the WUR and the MR. For example, the RRM signaling may be associated with a measurement performed by at least one of the WUR or the MR. In some aspects, the RRM signaling may occur in the updating occasions, as described above, or in the wake up signal described above. In some aspects, the RRM signaling may be an indication to offload one or more RRM measurements from the MR to the WUR or to switch from offloading to have the one or more RRM measurements be performed by the MR. In RRM offloading, one or more RRM measurements of one or more signals (e.g., in one or more RRM occasions) may be processed by the WUR rather than by the MR, which had been configured to perform the processing, for a particular interval of time (e.g., a specified amount of time or for an amount of time that the second radio component is off or in a reduced power mode). In some aspects, the UE may be configured with a set of RRM configurations. For example, the UE may have a first RRM configuration without RRM relaxation or RRM offloading and a second RRM configuration with RRM relaxation or RRM offloading. In this case, the UE may periodically switch between the RRM configurations, such as based at least in part on a received signal, a configured periodicity, and/or a state of the second radio component (e.g., when the second radio component is off, the UE may choose the RRM configuration with RRM relaxation or offloading), among other examples. In some aspects, RRM relaxation and/or RRM offloading may be based on an SSB, a CSI-RS, a corresponding LP-RS, and/or a corresponding LP-SS.

As shown in FIG. 8A, and by reference number 804, the UE may measure an SSB or CSI-RS during an RRM measurement. The UE may be configured with a set of RRM occasions in accordance with an RRM cycle and based on a WUR class associated with the UE. When RRM relaxation is enabled, the UE may skip one or more of the RRM occasions in accordance with a relaxed RRM cycle. Similarly, as shown by reference number 806, the UE may have an RRM offloading cycle. In this case, the UE measures an SSB or CSI-RS (e.g., using the second radio component) and offloads an LP-RS or LP-SS measurement to the first radio component in accordance with an offloading RRM cycle. Although RRM relaxation and RRM offloading are shown separately, it is contemplated that an RRM configuration may have both RRM relaxation and RRM offloading and the UE may skip some RRM monitoring occasions or stop RRM monitoring for a certain time duration (e.g., 1 hour) and offload other RRM monitoring occasions (e.g., to the first radio component). In some aspects, an RRM configuration may include, for example, a configuration of which measurements to perform, which radio component to use to perform the measurements, a cycle for skipping one or more RRM occasions, a cycle for offloading one or more RRM measurements, or another parameter. In some aspects, a UE and/or WUR capability may include at least one of a capability for decoding physical downlink control channel (PDCCH) based control signals, a capability for detecting on-off keying (OOK) based control signals, a capability for decoding OOK based control signals, a capability for decoding sequence based control signals, a capability for detecting orthogonal frequency-division multiplexing (OFDM) based reference signals, a capability for detecting OOK based reference signals, a capability for detecting sequence based reference signals, a capability for detecting OFDM based synchronization signals, a capability for detecting OOK based synchronization signals, or a capability for detecting sequence based synchronization signals, among other examples.

In some aspects, the one or more signals (or the wake up signal, itself) may trigger a CSI report. For example, the UE may perform CSI-RS or LP-RS processing of a CSI-RS or an LP-RS, respectively. Additionally, or alternatively, the UE may report information regarding a CSI-RS or an LP-RS. For example, the UE may transmit a CSI report based at least in part on a CSI-RS processed by the second radio component or an LP-RS processed by the first radio component. In this case, the UE may transmit the CSI report using the second radio component when the second radio component wakes up using one or more resources. In some aspects, the UE may bundle a plurality of reports into a single resource or may transmit a plurality of reports using a plurality of separate resources (e.g., configured by the network node). In some aspects, an LP-RS CSI report (or other channel state feedback (CSF) report) may include information identifying at least one of an RSRP, an RSRQ, an SINR value, an interference level, a CQI, an MCS, a precoding matrix indicator (PMI), a beamforming parameter (e.g., analog beam information or energy information (e.g., a charging rate, a discharging rate, power consumption level, or an energy level), such as when the UE has an energy harvesting capability (e.g., via radio frequency (RF) transmission harvesting, solar harvesting, or laser harvesting).

As shown in FIG. 8B, an LP-WUS 808 may include a preamble 810 and a wake up indicator 812. A set of communications for receipt using a WUR may include a set of LP-SSs 814 and an LP-WUS 808. The configurations of the LP-WUS 808 and/or the LP-SSs 814 may be based on a WUR class associated with a UE.

The LP-WUS 808 may be a signal that is similar to an NR WUS, which is a PDCCH-based DCI with polar coding (e.g., a coded control signal, such as DCI). The LP-WUS 808 may also be a sequence-based signal including, but not limited to a signal using a sequence associated with DFT, a Gold code, ASK, PSK, PPM, PWM, PAM, Walsh codes, m-sequences, Zadoff-Chu sequences, Reed-Solomon codes, or another type of coded signal. The LP-WUS may also be an OOK-based waveform signal. The waveform may be OFDM, modulating the time domain signal with low and high voltage signals.

An LP-RS (not shown) may be a sequence-based signal including, but not limited to a signal associated with DFT, Gold codes, ASK, PSK, PPM, PWM, PAM, Walsh codes, m-sequence, Zadoff-Chu sequences, or Reed-Solomon codes, among other examples. The LP-RS may also be an OOK-based waveform signal. The waveform may be OFDM, DFT-s-OFDM, signal carrier, or SC-QAM, modulating the time domain signal with different voltages.

The LP-SS 814 or another LP-preamble-synchronization signal may be a sequence-based signal similar to an SSB's PSS or an SSB's SSS. The LP-SS may also be a time domain sequence-based signal which is modulating the time domain signal with a sequence. The LP-SS may also be an OOK-based waveform signal. The waveform may be OFDM, modulating the time domain signal with low and high voltage signals.

Some aspects may include: an indication of "stop" RRM for one or more of serving cell or non-serving cell of one or more types for a certain duration X, wherein X is L1/L2/L3 configured through a MR or a WUR using LP-WUS or one of update signals or low power signal. Some aspects may include an indication of relaxation and a relaxation factor. Relaxation may have a skip or a stop for a duration for non-serving cells only (and for the MR), in some aspects. Some aspects may include an indication of offloading to a WUR and an offload factor or duration or configuration. Some aspects may include offloading for duration (e.g., configured using L1/L2/L3 for MR or L1/L2/L3 for WUR or using LP-WUS or update occasion). This may be for serving cell or non-serving cell and also for one or more types of measurement (e.g., inter-frequency or intra-frequency measurements). In some aspects, a UE can be indicated with 1 bit to relax RRM or with 1 bit for offloading or with one or more bits for relaxation and offloading. Then, a relaxation or offloading configuration can be used. Some aspects may use a plurality of bits to indicate relaxed RRM of serving cell (or non-serving cell or a certain type) and a relaxation configuration may be a particular configuration (e.g., one of plurality of known configurations). In another case, the plurality of bits may indicate that a relaxation factor is a particular value. Similar bit indicators may be used for offloading. A combination of bit indications may be used for relaxation and offloading. In some examples, a relax or stop may also be signaled (a network node) can indicate to an MR or a WUR how to operate during a particular duration). Then, the network node may switch between both using the MR or the WUR (using an LP signal or WUS or update occasion for communication).

As indicated above, FIGS. 8A and 8B are provided as examples. Other examples may differ from what is described with respect to FIGS. 8A and 8B.

Figure 9:
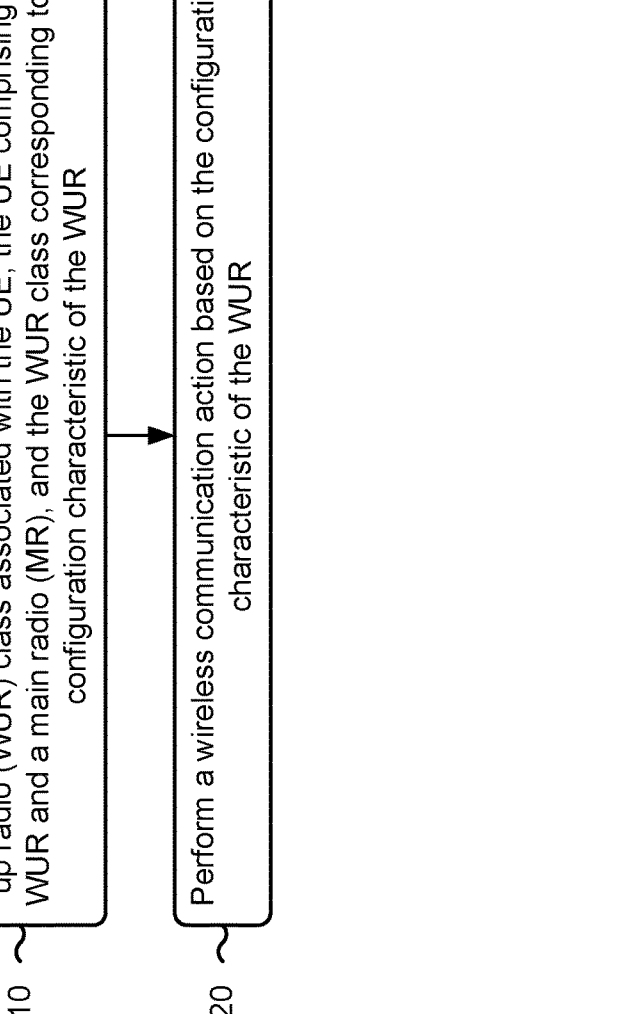
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 702) performs operations associated with WUR classification.

As shown in FIG. 9, in some aspects, process 900 may include transmitting, to a network node, a class indication that indicates a WUR class associated with the UE, the UE comprising a WUR and an MR, and the WUR class corresponding to a configuration characteristic of the WUR (block 910). For example, the UE (e.g., using communication manager 1108 and/or transmission component 1104, depicted in FIG. 11) may transmit, to a network node, a class indication that indicates a WUR class associated with the UE, the UE comprising a WUR and an MR, and the WUR class corresponding to a configuration characteristic of the WUR, as described above.

As further shown in FIG. 9, in some aspects, process 900 may include performing a wireless communication action based on the configuration characteristic of the WUR (block 920). For example, the UE (e.g., using communication manager 1108, reception component 1102, and/or transmission component 1104, depicted in FIG. 11) may perform a wireless communication action based on the configuration characteristic of the WUR, as described above.

Process 900 may include additional aspects, such as any single aspect or any combination of aspects described below and/or in connection with one or more other processes described elsewhere herein.

In a first aspect, transmitting the class indication comprises transmitting the class indication using the WUR. In a second aspect, alone or in combination with the first aspect, the UE comprises an MR that is different than the WUR, and transmitting the class indication comprises transmitting the class indication using the MR. In a third aspect, alone or in combination with one or more of the first and second aspects, the configuration characteristic corresponds to a UE capability. In a fourth aspect, alone or in combination with one or more of the first through third aspects, the UE capability comprises at least one of a capability for decoding PDCCH based control signals, a capability for detecting OOK based control signals, a capability for decoding OOK based control signals, a capability for decoding sequence based control signals, a capability for detecting OFDM based reference signals, a capability for detecting OOK based reference signals, a capability for detecting sequence based reference signals, a capability for detecting OFDM based synchronization signals, a capability for detecting OOK based synchronization signals, or a capability for detecting sequence based synchronization signals.

In a fifth aspect, alone or in combination with one or more of the first through fourth aspects, the configuration characteristic corresponds to power consumption information. In a sixth aspect, alone or in combination with one or more of the first through fifth aspects, the power consumption information indicates at least one of a power consumption model, an average power consumption, or a power consumption associated with a reference wake up signal. In a seventh aspect, alone or in combination with one or more of the first through sixth aspects, process 900 includes transmitting capability information that indicates the power consumption information.

In an eighth aspect, alone or in combination with one or more of the first through seventh aspects, performing the wireless communication action comprises performing a class-based RRM operation, wherein capability and class-based RRM operation based on at least one of a frequency range, a frequency band, or a frequency band combination. In a ninth aspect, alone or in combination with one or more of the first through eighth aspects, performing the class-based RRM operation comprises at least one of performing a relaxed RRM operation or offloading one or more RRM operations from the WUR to the MR. In a tenth aspect, alone or in combination with one or more of the first through ninth aspects, performing the class-based RRM operation comprises performing the class-based RRM operation associated with at least one of a serving cell or a non-serving cell. In an eleventh aspect, alone or in combination with one or more of the first through tenth aspects, performing the class-based RRM operation comprises performing the class-based RRM operation during a WUR usage period.

In a twelfth aspect, alone or in combination with one or more of the first through eleventh aspects, the WUR usage period corresponds to at least one of an energy harvesting operation or a low power operation. In a thirteenth aspect, alone or in combination with one or more of the first through twelfth aspects, performing the class-based RRM operation comprises performing, using the MR, the class-based RRM operation during an energy harvesting operation, wherein using the MR comprises using the MR based on at least one of a low charging rate, a low energy state, or a high discharging rate. In a fourteenth aspect, alone or in combination with one or more of the first through thirteenth aspects, performing the class-based RRM operation comprises performing the class-based RRM operation during an MR usage period and based on at least one of an energy profile associated with the MR or an energy profile associated with the WUR. In a fifteenth aspect, alone or in combination with one or more of the first through fourteenth aspects, the energy profile comprises at least one of a charging rate profile, a discharging rate profile, an energy state profile, or an energy profile function. In a sixteenth aspect, alone or in combination with one or more of the first through fifteenth aspects, performing the class-based RRM operation comprises performing the class-based RRM operation based on a periodic operating cycle.

In a seventeenth aspect, alone or in combination with one or more of the first through sixteenth aspects, the WUR comprises a passive RFID tag radio. In an eighteenth aspect, alone or in combination with one or more of the first through seventeenth aspects, the WUR uses an amount of energy from an energy storage unit that satisfies an energy threshold. In a nineteenth aspect, alone or in combination with one or more of the first through eighteenth aspects, the WUR comprises a function of the MR, the function corresponding to a semi-passive RFID tag radio operation. In a twentieth aspect, alone or in combination with one or more of the first through nineteenth aspects, the configuration characteristic of the WUR corresponds to at least one of a radio frequency energy harvesting operation, a solar energy harvesting operation, a thermal energy harvesting operation, a light energy harvesting operation, or a laser energy harvesting operation.

In a twenty-first aspect, alone or in combination with one or more of the first through twentieth aspects, the WUR comprises at least one of a semi-active radio frequency identifier (RFID) tag radio or an active RFID tag radio. In a twenty-second aspect, alone or in combination with one or more of the first through twenty-first aspects, the WUR comprises at least one of a hardware component of the MR, a software component of the MR, a radio-frequency component of the MR, or a firmware component of the MR. In a twenty-third aspect, alone or in combination with one or more of the first through twenty-second aspects, the UE comprises a hybrid radio that includes the WUR and the MR. In a twenty-fourth aspect, alone or in combination with one or more of the first through twenty-third aspects, the configuration characteristic comprises at least one of an energy profile of the WUR or an energy profile of the MR, and performing the wireless communication action comprises receiving a signal having a signal type, wherein the signal type is based on the energy profile. In a twenty-fifth aspect, alone or in combination with one or more of the first through twenty-fourth aspects, process 900 includes transmitting energy profile information corresponding to the energy profile.

In a twenty-sixth aspect, alone or in combination with one or more of the first through twenty-fifth aspects, performing the wireless communication action comprises performing at least one of an inter-frequency SSB monitoring operation associated with a serving cell, an intra-frequency SSB monitoring operation associated with a serving cell, an inter-frequency SSB monitoring operation associated with a neighbor cell, an intra-frequency SSB monitoring operation associated with a neighbor cell, an inter-frequency RRM operation associated with a serving cell, an intra-frequency RRM operation associated with a serving cell, an inter-frequency RRM operation associated with a neighbor cell, or an intra-frequency RRM operation associated with a neighbor cell.

In a twenty-seventh aspect, alone or in combination with one or more of the first through twenty-sixth aspects, an operating parameter associated with the wireless communication action is based on the WUR class. In a twenty-eighth aspect, alone or in combination with one or more of the first through twenty-seventh aspects, the operating parameter comprises at least one of an expected synchronization time, a minimum periodicity of a synchronization signal, a paging frequency, a modem power associated with a sleep state, a modem power associated with a wake up signal reception state, a power profile of the WUR, a power state, a power consumption associated with a power state, a wake up time based on a wake up indication, or a restriction associated with a restricted wake up time. In a twenty-ninth aspect, alone or in combination with one or more of the first through twenty-eighth aspects, the configuration characteristic corresponds to a degree of integration between the WUR and the MR, and the operating parameter comprises a switching time associated with switching operation between the WUR and the MR.

In a thirtieth aspect, alone or in combination with one or more of the first through twenty-ninth aspects, the operating parameter comprises at least one of clocking information, or a clock accuracy. In a thirty-first aspect, alone or in combination with one or more of the first through thirtieth aspects, process 900 includes receiving, based on the clock accuracy and the configuration characteristic, a low power signal configuration. In a thirty-second aspect, alone or in combination with one or more of the first through thirty-first aspects, the operating parameter comprises at least one of a value, a range of values, or a statistic associated with a value.

In a thirty-third aspect, alone or in combination with one or more of the first through thirty-second aspects, process 900 includes receiving an indication of a switching time associated with switching operation between the WUR and the MR. In a thirty-fourth aspect, alone or in combination with one or more of the first through thirty-third aspects, the WUR class is associated with an MR type. In a thirty-fifth aspect, alone or in combination with one or more of the first through thirty-fourth aspects, performing the wireless communication action comprises performing the wireless communication action based on a WUR DRX configuration, and the WUR DRX configuration is based on the WUR class. In a thirty-sixth aspect, alone or in combination with one or more of the first through thirty-fifth aspects, the WUR class corresponds to a UE type. In a thirty-seventh aspect, alone or in combination with one or more of the first through thirty-sixth aspects, performing the wireless communication action comprises performing the wireless communication action based on an MR DRX configuration, and the MR DRX configuration is based on at least one of the WUR class or a UE class.

In a thirty-eighth aspect, alone or in combination with one or more of the first through thirty-seventh aspects, the configuration characteristic corresponds to at least one of a band, a band combination, a frequency range, a bandwidth part, a bandwidth combination, a component carrier, or a component carrier combination. In a thirty-ninth aspect, alone or in combination with one or more of the first through thirty-eighth aspects, performing the wireless communication action further comprises performing the wireless communication action based on at least one of a band, a band combination, a frequency range, a bandwidth part, a bandwidth combination, a component carrier, or a component carrier combination.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
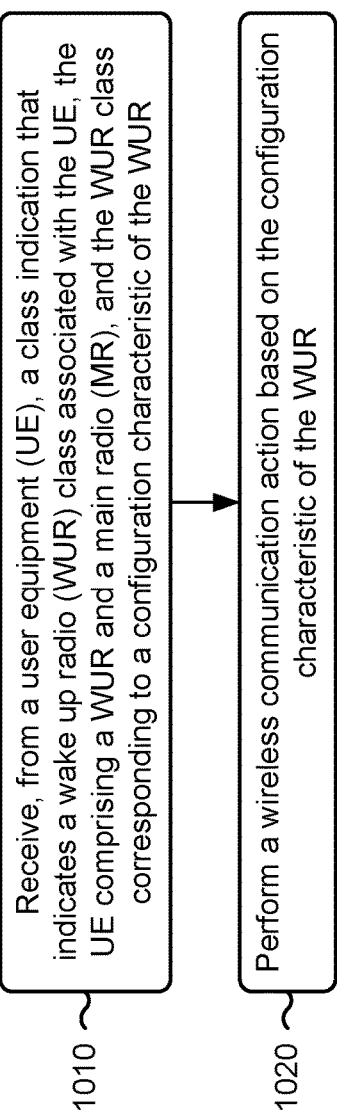
FIG. 10 is a diagram illustrating an example process performed, for example, by a network node, in accordance with the present disclosure.
Figure 10:

FIG. 10 is a diagram illustrating an example process 1000 performed, for example, by a network node, in accordance with the present disclosure. Example process 1000 is an example where the network node (e.g., network node 704) performs operations associated with WUR classification.

As shown in FIG. 10, in some aspects, process 1000 may include receiving, from a UE, a class indication that indicates a WUR class associated with the UE, the UE comprising a WUR and an MR, and the WUR class corresponding to a configuration characteristic of the WUR (block 1010). For example, the network node (e.g., using communication manager 1208 and/or reception component 1202, depicted in FIG. 12) may receive, from a UE, a class indication that indicates a WUR class associated with the UE, the UE comprising a WUR and an MR, and the WUR class corresponding to a configuration characteristic of the WUR, as described above.

As further shown in FIG. 10, in some aspects, process 1000 may include performing a wireless communication action based on the configuration characteristic of the WUR (block 1020). For example, the network node (e.g., using communication manager 1208, reception component 1202, and/or transmission component 1204, depicted in FIG. 12) may perform a wireless communication action based on the configuration characteristic of the WUR, as described above.

Process 1000 may include additional aspects, such as any single aspect or any combination of aspects described below and/or in connection with one or more other processes described elsewhere herein.

In a first aspect, receiving the class indication comprises receiving the class indication using the WUR. In a second aspect, alone or in combination with the first aspect, the UE comprises an MR that is different than the WUR, wherein receiving the class indication comprises receiving the class indication from the MR. In a third aspect, alone or in combination with one or more of the first and second aspects, the configuration characteristic corresponds to a UE capability. In a fourth aspect, alone or in combination with one or more of the first through third aspects, the UE capability comprises at least one of a capability for decoding PDCCH based control signals, a capability for detecting OOK based control signals, a capability for decoding OOK based control signals, a capability for decoding sequence based control signals, a capability for detecting OFDM based reference signals, a capability for detecting OOK based reference signals, a capability for detecting sequence based reference signals, a capability for detecting OFDM based synchronization signals, a capability for detecting OOK based synchronization signals, or a capability for detecting sequence based synchronization signals.

In a fifth aspect, alone or in combination with one or more of the first through fourth aspects, the configuration characteristic corresponds to power consumption information. In a sixth aspect, alone or in combination with one or more of the first through fifth aspects, the power consumption information indicates at least one of a power consumption model, an average power consumption, or a power consumption associated with a reference wake up signal. In a seventh aspect, alone or in combination with one or more of the first through sixth aspects, process 1000 includes receiving capability information that indicates the power consumption information.

In an eighth aspect, alone or in combination with one or more of the first through seventh aspects, the wireless communication action corresponds to a class-based RRM operation, wherein capability and class-based RRM operation based on at least one of a frequency range, a frequency band, or a frequency band combination. In a ninth aspect, alone or in combination with one or more of the first through eighth aspects, the class-based RRM operation comprises at least one of a relaxed RRM operation or an offloading of one or more RRM operations from the WUR to the MR. In a tenth aspect, alone or in combination with one or more of the first through ninth aspects, the class-based RRM operation is associated with at least one of a serving cell or a non-serving cell. In an eleventh aspect, alone or in combination with one or more of the first through tenth aspects, the class-based RRM operation is associated with a WUR usage period. In a twelfth aspect, alone or in combination with one or more of the first through eleventh aspects, the WUR usage period corresponds to at least one of an energy harvesting operation or a low power operation. In a thirteenth aspect, alone or in combination with one or more of the first through twelfth aspects, the class-based RRM operation is associated with the MR during an energy harvesting operation, wherein the MR is associated with at least one of a low charging rate, a low energy state, or a high discharging rate. In a fourteenth aspect, alone or in combination with one or more of the first through thirteenth aspects, the class-based RRM operation is associated with an MR usage period and based on at least one of an energy profile associated with the MR or an energy profile associated with the WUR. In a fifteenth aspect, alone or in combination with one or more of the first through fourteenth aspects, the energy profile comprises at least one of a charging rate profile, a discharging rate profile, an energy state profile, or an energy profile function. In a sixteenth aspect, alone or in combination with one or more of the first through fifteenth aspects, the class-based RRM operation comprises is associated with a periodic operating cycle.

In a seventeenth aspect, alone or in combination with one or more of the first through sixteenth aspects, the WUR comprises a passive RFID tag radio. In an eighteenth aspect, alone or in combination with one or more of the first through seventeenth aspects, the WUR uses an amount of energy from an energy storage unit that satisfies an energy threshold. In a nineteenth aspect, alone or in combination with one or more of the first through eighteenth aspects, the WUR comprises a function of the MR, the function corresponding to a semi-passive RFID tag radio operation. In a twentieth aspect, alone or in combination with one or more of the first through nineteenth aspects, the configuration characteristic of the WUR corresponds to at least one of a radio frequency energy harvesting operation, a solar energy harvesting operation, a thermal energy harvesting operation, a light energy harvesting operation, or a laser energy harvesting operation. In a twenty-first aspect, alone or in combination with one or more of the first through twentieth aspects, the WUR comprises at least one of a semi-active RFID tag radio or an active RFID tag radio. In a twenty-second aspect, alone or in combination with one or more of the first through twenty-first aspects, the WUR comprises at least one of a hardware component of the MR, a software component of the MR, a radio-frequency component of the MR, or a firmware component of the MR. In a twenty-third aspect, alone or in combination with one or more of the first through twenty-second aspects, the UE comprises a hybrid radio that includes the WUR and the MR. In a twenty-fourth aspect, alone or in combination with one or more of the first through twenty-third aspects, the configuration characteristic comprises at least one of an energy profile of the WUR or an energy profile of the MR, and the wireless communication action comprises transmitting a signal having a signal type, wherein the signal type is based on the energy profile. In a twenty-fifth aspect, alone or in combination with one or more of the first through twenty-fourth aspects, process 1000 includes receiving energy profile information corresponding to the energy profile.

In a twenty-sixth aspect, alone or in combination with one or more of the first through twenty-fifth aspects, the wireless communication action is associated with at least one of an inter-frequency SSB monitoring operation associated with a serving cell, an intra-frequency SSB monitoring operation associated with a serving cell, an inter-frequency SSB monitoring operation associated with a neighbor cell, an intra-frequency SSB monitoring operation associated with a neighbor cell, an inter-frequency RRM operation associated with a serving cell, an intra-frequency RRM operation associated with a serving cell, an inter-frequency RRM operation associated with a neighbor cell, or an intra-frequency RRM operation associated with a neighbor cell. In a twenty-seventh aspect, alone or in combination with one or more of the first through twenty-sixth aspects, an operating parameter associated with the wireless communication action is based on the WUR class. In a twenty-eighth aspect, alone or in combination with one or more of the first through twenty-seventh aspects, the operating parameter comprises at least one of an expected synchronization time, a minimum periodicity of a synchronization signal, a paging frequency, a modem power associated with a sleep state, a modem power associated with a wake up signal reception state, a power profile of the WUR, a power state, a power consumption associated with a power state, a wake up time based on a wake up indication, or a restriction associated with a restricted wake up time. In a twenty-ninth aspect, alone or in combination with one or more of the first through twenty-eighth aspects, the configuration characteristic corresponds to a degree of integration between the WUR and the MR, and the operating parameter comprises a switching time associated with switching operation between the WUR and the MR.

In a thirtieth aspect, alone or in combination with one or more of the first through twenty-ninth aspects, the operating parameter comprises at least one of clocking information, or a clock accuracy. In a thirty-first aspect, alone or in combination with one or more of the first through thirtieth aspects, process 1000 includes transmitting, based on the clock accuracy and the configuration characteristic, a low power signal configuration. In a thirty-second aspect, alone or in combination with one or more of the first through thirty-first aspects, the operating parameter comprises at least one of a value, a range of values, or a statistic associated with a value. In a thirty-third aspect, alone or in combination with one or more of the first through thirty-second aspects, process 1000 includes transmitting an indication of a switching time associated with switching operation between the WUR and the MR. In a thirty-fourth aspect, alone or in combination with one or more of the first through thirty-third aspects, the WUR class is associated with an MR type.

In a thirty-fifth aspect, alone or in combination with one or more of the first through thirty-fourth aspects, the wireless communication action is based on a WUR DRX configuration, and the WUR DRX configuration is based on the WUR class. In a thirty-sixth aspect, alone or in combination with one or more of the first through thirty-fifth aspects, the WUR class corresponds to a UE type. In a thirty-seventh aspect, alone or in combination with one or more of the first through thirty-sixth aspects, the wireless communication action is based on an MR DRX configuration, and the MR DRX configuration is based on at least one of the WUR class or a UE class.

In a thirty-eighth aspect, alone or in combination with one or more of the first through thirty-seventh aspects, the configuration characteristic corresponds to at least one of a band, a band combination, a frequency range, a bandwidth part, a bandwidth combination, a component carrier, or a component carrier combination. In a thirty-ninth aspect, alone or in combination with one or more of the first through thirty-eighth aspects, the wireless communication action is based on at least one of a band, a band combination, a frequency range, a bandwidth part, a bandwidth combination, a component carrier, or a component carrier combination.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
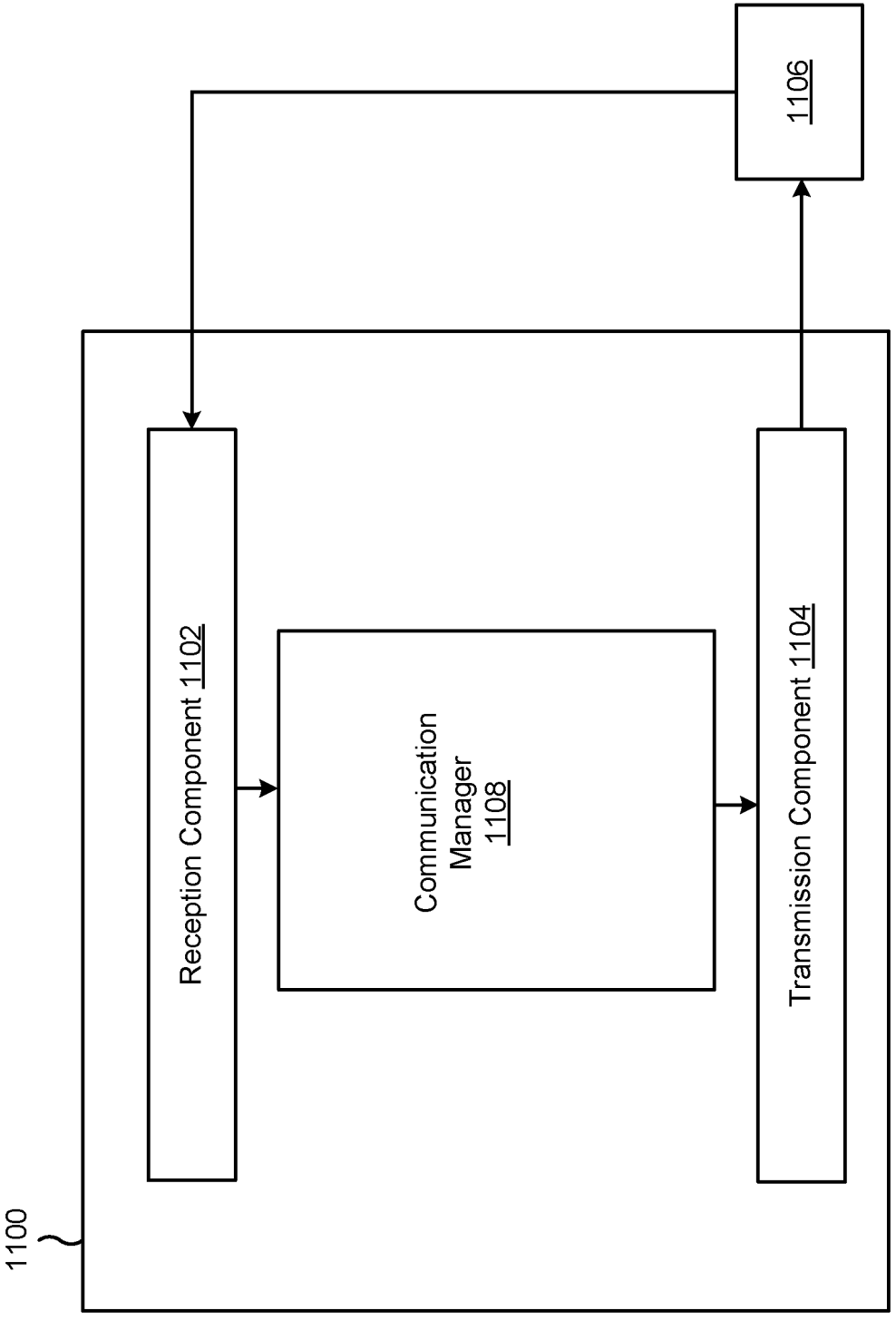
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108.

In some aspects, the apparatus 1100 may be configured to perform one or more operations described herein in connection with FIGS. 7-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

In some examples, means for transmitting, outputting, or sending (or means for outputting for transmission) may include one or more antennas, a modulator, a transmit MIMO processor, a transmit processor, or a combination thereof, of the UE described above in connection with FIG. 2.

In some examples, means for receiving (or means for obtaining) may include one or more antennas, a demodulator, a MIMO detector, a receive processor, or a combination thereof, of the UE described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for receiving, transmitting, and/or performing may include various processing system components, such as a receive processor, a transmit processor, a controller/processor, a memory, or a combination thereof, of the UE described above in connection with FIG. 2.

The communication manager 1108 and/or the transmission component 1104 may transmit, to a network node, a class indication that indicates a WUR class associated with the UE, the UE comprising a WUR and an MR, and the WUR class corresponding to a configuration characteristic of the WUR. In some aspects, the communication manager 1108 may include one or more antennas, a modem, a controller/processor, a memory, or a combination thereof, of the UE described in connection with FIG. 2. In some aspects, the communication manager 1108 may include the reception component 1102 and/or the transmission component 1104. In some aspects, the communication manager 1108 may be, be similar to, include, or be included in, the communication manager 140 depicted in FIGS. 1 and 2.

The communication manager 1108, the reception component 1102 and/or the transmission component 1104 may perform a wireless communication action based on the configuration characteristic of the WUR. The communication manager 1108 and/or the transmission component 1104 may transmit capability information that indicates the power consumption information. The communication manager 1108 and/or the transmission component 1104 may transmit energy profile information corresponding to the energy profile. The communication manager 1108 and/or the reception component 1102 may receive, based on the clock accuracy and the configuration characteristic, a low power signal configuration. The communication manager 1108 and/or the reception component 1102 may receive an indication of a switching time associated with switching operation between the WUR and the MR.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
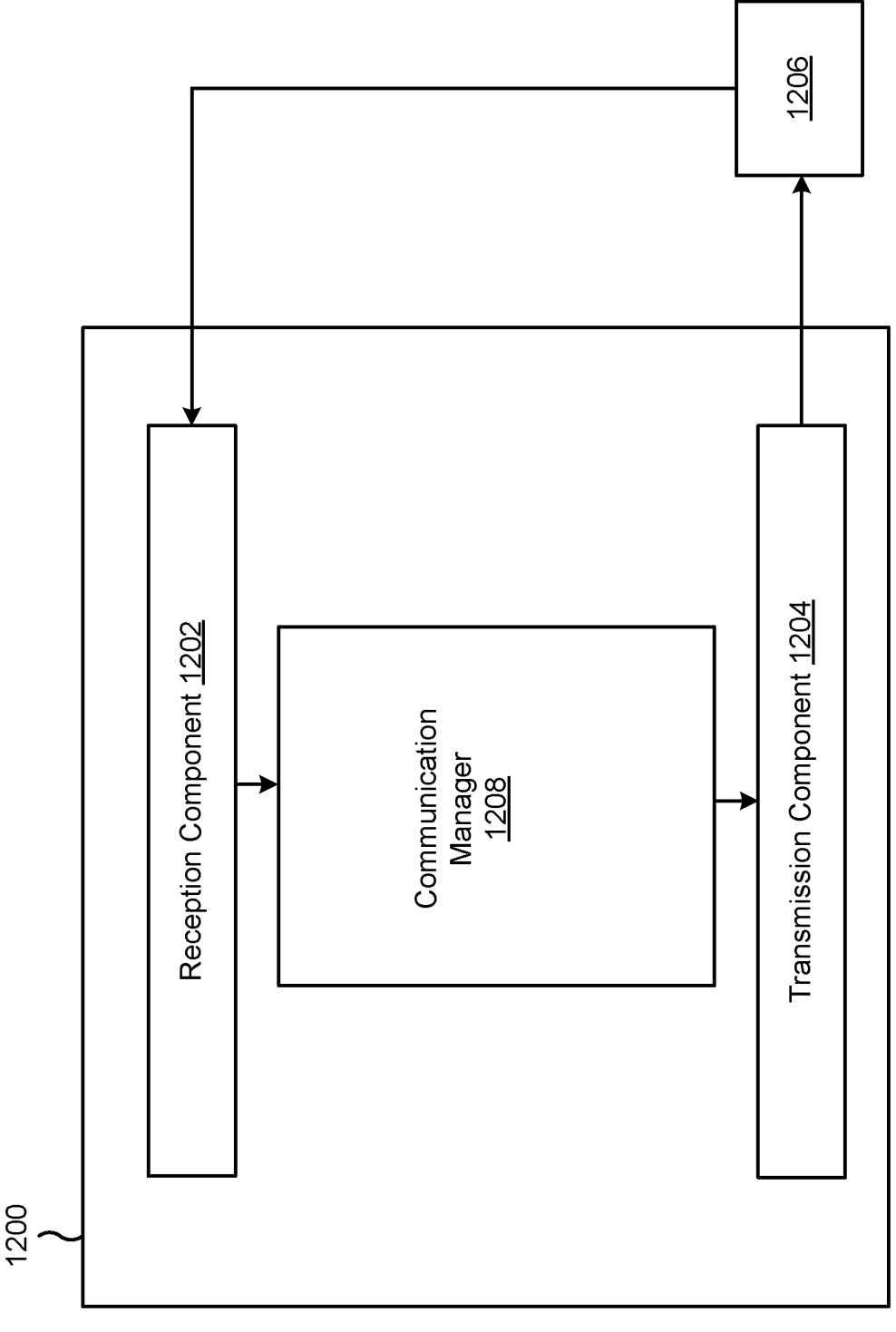
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a communication manager 1208.

In some aspects, the apparatus 1200 may be configured to perform one or more operations described herein in connection with FIGS. 7-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

In some examples, means for transmitting, outputting, or sending (or means for outputting for transmission) may include one or more antennas, a modulator, a transmit MIMO processor, a transmit processor, or a combination thereof, of the network node described above in connection with FIG. 2.

In some examples, means for receiving (or means for obtaining) may include one or more antennas, a demodulator, a MIMO detector, a receive processor, or a combination thereof, of the network node described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for receiving and/or transmitting may include various processing system components, such as a receive processor, a transmit processor, a controller/processor, a memory, or a combination thereof, of the network node described above in connection with FIG. 2.

The communication manager 1208 and/or the reception component 1202 may receive, from a UE, a class indication that indicates a WUR class associated with the UE, the UE comprising a WUR and an MR, and the WUR class corresponding to a configuration characteristic of the WUR. In some aspects, the communication manager 1208 may include one or more antennas, a modem, a controller/processor, a memory, or a combination thereof, of the network node described in connection with FIG. 2. In some aspects, the communication manager 1208 may include the reception component 1202 and/or the transmission component 1204. In some aspects, the communication manager 1208 may be, be similar to, include, or be included in, the communication manager 150 depicted in FIGS. 1 and 2.

The communication manager 1208, the reception component 1202, and/or the transmission component 1204 may perform a wireless communication action based on the configuration characteristic of the WUR. The communication manager 1208 and/or the reception component 1202 may receive capability information that indicates the power consumption information. The communication manager 1208 and/or the reception component 1202 may receive energy profile information corresponding to the energy profile. The communication manager 1208 and/or the transmission component 1204 may transmit, based on the clock accuracy and the configuration characteristic, a low power signal configuration. The communication manager 1208 and/or the transmission component 1204 may transmit an indication of a switching time associated with switching operation between the WUR and the MR.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by an apparatus of a user equipment (UE), comprising: transmitting, to a network node, a class indication that indicates a wake up radio (WUR) class associated with the UE, the UE comprising a WUR and a main radio (MR), and the WUR class corresponding to a configuration characteristic of the WUR; and performing a wireless communication action based on the configuration characteristic of the WUR.

Aspect 2: The method of Aspect 1, wherein transmitting the class indication comprises transmitting the class indication using the WUR.

Aspect 3: The method of either of Aspects 1 or 2, the UE comprising a main radio (MR) that is different than the WUR, wherein transmitting the class indication comprises transmitting the class indication using the MR.

Aspect 4: The method of any of Aspects 1-3, wherein the configuration characteristic corresponds to a UE capability.

Aspect 5: The method of Aspect 4, wherein the UE capability comprises at least one of: a capability for decoding physical downlink control channel (PDCCH) based control signals, a capability for detecting on-off keying (OOK) based control signals, a capability for decoding OOK based control signals, a capability for decoding sequence based control signals, a capability for detecting orthogonal frequency-division multiplexing (OFDM) based reference signals, a capability for detecting OOK based reference signals, a capability for detecting sequence based reference signals, a capability for detecting OFDM based synchronization signals, a capability for detecting OOK based synchronization signals, or a capability for detecting sequence based synchronization signals.

Aspect 6: The method of either of Aspects 4 or 5, wherein the configuration characteristic corresponds to power consumption information.

Aspect 7: The method of Aspect 6, wherein the power consumption information indicates at least one of a power consumption model, an average power consumption, or a power consumption associated with a reference wake up signal.

Aspect 8: The method of either of Aspects 6 or 7, further comprising transmitting capability information that indicates the power consumption information.

Aspect 9: The method of any of Aspects 1-8, wherein performing the wireless communication action comprises performing a class-based radio resource management (RRM) operation, wherein capability and class-based RRM operation based on at least one of a frequency range, a frequency band, or a frequency band combination.

Aspect 10: The method of Aspect 9, wherein performing the class-based RRM operation comprises at least one of performing a relaxed radio resource management (RRM) operation or offloading one or more RRM operations from the WUR to the MR.

Aspect 11: The method of either of Aspects 9 or 10, wherein performing the class-based RRM operation comprises performing the class-based RRM operation associated with at least one of a serving cell or a non-serving cell.

Aspect 12: The method of any of Aspects 9-11, wherein performing the class-based RRM operation comprises performing the class-based RRM operation during a WUR usage period.

Aspect 13: The method of Aspect 12, wherein the WUR usage period corresponds to at least one of an energy harvesting operation or a low power operation.

Aspect 14: The method of any of Aspects 9-13, wherein performing the class-based RRM operation comprises performing, using the MR, the class-based RRM operation during an energy harvesting operation, wherein using the MR comprises using the MR based on at least one of a low charging rate, a low energy state, or a high discharging rate.

Aspect 15: The method of any of Aspects 9-14, wherein performing the class-based RRM operation comprises performing the class-based RRM operation during an MR usage period and based on at least one of an energy profile associated with the MR or an energy profile associated with the WUR.

Aspect 16: The method of Aspect 15, wherein the energy profile comprises at least one of a charging rate profile, a discharging rate profile, an energy state profile, or an energy profile function.

Aspect 17: The method of any of Aspects 9-16, wherein performing the class-based RRM operation comprises performing the class-based RRM operation based on a periodic operating cycle.

Aspect 18: The method of any of Aspects 1-17, wherein the WUR comprises a passive radio frequency identification (RFID) tag radio.

Aspect 19: The method of Aspect 18, wherein the WUR uses an amount of energy from an energy storage unit that satisfies an energy threshold.

Aspect 20: The method of any of Aspects 1-18, wherein the WUR comprises a function of the MR, the function corresponding to a semi-passive radio frequency identifier (RFID) tag radio operation.

Aspect 21: The method of any of Aspects 1-20, wherein the configuration characteristic of the WUR corresponds to at least one of a radio frequency energy harvesting operation, a solar energy harvesting operation, a thermal energy harvesting operation, a light energy harvesting operation, or a laser energy harvesting operation.

Aspect 22: The method of any of Aspects 1-21, wherein the WUR comprises at least one of a semi-active radio frequency identifier (RFID) tag radio or an active RFID tag radio.

Aspect 23: The method of any of Aspects 1-22, wherein the WUR comprises at least one of a hardware component of the MR, a software component of the MR, a radio-frequency component of the MR, or a firmware component of the MR.

Aspect 24: The method of any of Aspects 1-23, wherein the UE comprises a hybrid radio that includes the WUR and the MR.

Aspect 25: The method of any of Aspects 1-24, wherein the configuration characteristic comprises at least one of an energy profile of the WUR or an energy profile of the MR, and wherein performing the wireless communication action comprises receiving a signal having a signal type, wherein the signal type is based on the energy profile.

Aspect 26: The method of Aspect 25, further comprising transmitting energy profile information corresponding to the energy profile.

Aspect 27: The method of any of Aspects 1-26, wherein performing the wireless communication action comprises performing at least one of: an inter-frequency synchronization signal block (SSB) monitoring operation associated with a serving cell, an intra-frequency SSB monitoring operation associated with a serving cell, an inter-frequency SSB monitoring operation associated with a neighbor cell, an intra-frequency SSB monitoring operation associated with a neighbor cell, an inter-frequency radio resource management (RRM) operation associated with a serving cell, an intra-frequency RRM operation associated with a serving cell, an inter-frequency RRM operation associated with a neighbor cell, or an intra-frequency RRM operation associated with a neighbor cell.

Aspect 28: The method of any of Aspects 1-27, wherein an operating parameter associated with the wireless communication action is based on the WUR class.

Aspect 29: The method of Aspect 28, wherein the operating parameter comprises at least one of: an expected synchronization time, a minimum periodicity of a synchronization signal, a paging frequency, a modem power associated with a sleep state, a modem power associated with a wake up signal reception state, a power profile of the WUR, a power state, a power consumption associated with a power state, a wake up time based on a wake up indication, or a restriction associated with a restricted wake up time.

Aspect 30: The method of either of Aspects 28 or 29, wherein the configuration characteristic corresponds to a degree of integration between the WUR and the MR, and wherein the operating parameter comprises a switching time associated with switching operation between the WUR and the MR.

Aspect 31: The method of any of Aspects 28-30, wherein the operating parameter comprises at least one of: clock information, or a clock accuracy.

Aspect 32: The method of Aspect 31, further comprising receiving, based on the clock accuracy and the configuration characteristic, a low power signal configuration.

Aspect 33: The method of any of Aspects 28-32, wherein the operating parameter comprises at least one of a value, a range of values, or a statistic associated with a value.

Aspect 34: The method of any of Aspects 1-33, further comprising receiving an indication of a switching time associated with switching operation between the WUR and the MR.

Aspect 35: The method of any of Aspects 1-34, wherein the WUR class is associated with an MR type.

Aspect 36: The method of any of Aspects 1-35, wherein performing the wireless communication action comprises performing the wireless communication action based on a WUR discontinuous reception (DRX) configuration, and wherein the WUR DRX configuration is based on the WUR class.

Aspect 37: The method of Aspect 36, wherein the WUR class corresponds to a UE type.

Aspect 38: The method of any of Aspects 1-37, wherein performing the wireless communication action comprises performing the wireless communication action based on a main radio (MR) discontinuous reception (DRX) configuration, and wherein the MR DRX configuration is based on at least one of the WUR class or a UE class.

Aspect 39: The method of any of Aspects 1-38, wherein the configuration characteristic corresponds to at least one of a band, a band combination, a frequency range, a bandwidth part, a bandwidth combination, a component carrier, or a component carrier combination.

Aspect 40: The method of any of Aspects 1-39, wherein performing the wireless communication action further comprises performing the wireless communication action based on at least one of a band, a band combination, a frequency range, a bandwidth part, a bandwidth combination, a component carrier, or a component carrier combination.

Aspect 41: A method of wireless communication performed by an apparatus of a network node, comprising: receiving, from a user equipment (UE), a class indication that indicates a wake up radio (WUR) class associated with the UE, the UE comprising a WUR and a main radio (MR), and the WUR class corresponding to a configuration characteristic of the WUR; and performing a wireless communication action based on the configuration characteristic of the WUR.

Aspect 42: The method of Aspect 41, wherein receiving the class indication comprises receiving the class indication using the WUR.

Aspect 43: The method of either of Aspects 41 or 42, the UE comprising a main radio (MR) that is different than the WUR, wherein receiving the class indication comprises receiving the class indication from the MR.

Aspect 44: The method of any of Aspects 41-43, wherein the configuration characteristic corresponds to a UE capability.

Aspect 45: The method of Aspect 44, wherein the UE capability comprises at least one of: a capability for decoding physical downlink control channel (PDCCH) based control signals, a capability for detecting on-off keying (OOK) based control signals, a capability for decoding OOK based control signals, a capability for decoding sequence based control signals, a capability for detecting orthogonal frequency-division multiplexing (OFDM) based reference signals, a capability for detecting OOK based reference signals, a capability for detecting sequence based reference signals, a capability for detecting OFDM based synchronization signals, a capability for detecting OOK based synchronization signals, or a capability for detecting sequence based synchronization signals.

Aspect 46: The method of either of Aspects 44 or 45, wherein the configuration characteristic corresponds to power consumption information.

Aspect 47: The method of Aspect 46, wherein the power consumption information indicates at least one of a power consumption model, an average power consumption, or a power consumption associated with a reference wake up signal.

Aspect 48: The method of either of Aspects 46 or 47, further comprising receiving capability information that indicates the power consumption information.

Aspect 49: The method of any of Aspects 41-48, wherein the wireless communication action corresponds to a class-based radio resource management (RRM) operation, wherein capability and class-based RRM operation based on at least one of a frequency range, a frequency band, or a frequency band combination.

Aspect 50: The method of Aspect 49, wherein the class-based RRM operation comprises at least one of a relaxed radio resource management (RRM) operation or an offloading of one or more RRM operations from the WUR to the MR.

Aspect 51: The method of either of Aspects 49 or 50, wherein the class-based RRM operation is associated with at least one of a serving cell or a non-serving cell.

Aspect 52: The method of any of Aspects 49-51, wherein the class-based RRM operation is associated with a WUR usage period.

Aspect 53: The method of Aspect 52, wherein the WUR usage period corresponds to at least one of an energy harvesting operation or a low power operation.

Aspect 54: The method of any of Aspects 49-53, wherein the class-based RRM operation is associated with the MR during an energy harvesting operation, wherein the MR is associated with at least one of a low charging rate, a low energy state, or a high discharging rate.

Aspect 55: The method of any of Aspects 49-54, wherein the class-based RRM operation is associated with an MR usage period and based on at least one of an energy profile associated with the MR or an energy profile associated with the WUR.

Aspect 56: The method of Aspect 55, wherein the energy profile comprises at least one of a charging rate profile, a discharging rate profile, an energy state profile, or an energy profile function.

Aspect 57: The method of any of Aspects 49-56, wherein the class-based RRM operation comprises is associated with a periodic operating cycle.

Aspect 58: The method of any of Aspects 41-57, wherein the WUR comprises a passive radio frequency identification (RFID) tag radio.

Aspect 59: The method of Aspect 58, wherein the WUR uses an amount of energy from an energy storage unit that satisfies an energy threshold.

Aspect 60: The method of any of Aspects 41-59, wherein the WUR comprises a function of the MR, the function corresponding to a semi-passive radio frequency identifier (RFID) tag radio operation.

Aspect 61: The method of any of Aspects 41-60, wherein the configuration characteristic of the WUR corresponds to at least one of a radio frequency energy harvesting operation, a solar energy harvesting operation, a thermal energy harvesting operation, a light energy harvesting operation, or a laser energy harvesting operation.

Aspect 62: The method of any of Aspects 41-61, wherein the WUR comprises at least one of a semi-active radio frequency identifier (RFID) tag radio or an active RFID tag radio.

Aspect 63: The method of any of Aspects 41-62, wherein the WUR comprises at least one of a hardware component of the MR, a software component of the MR, a radio-frequency component of the MR, or a firmware component of the MR.

Aspect 64: The method of any of Aspects 41-63, wherein the UE comprises a hybrid radio that includes the WUR and the MR.

Aspect 65: The method of any of Aspects 41-64, wherein the configuration characteristic comprises at least one of an energy profile of the WUR or an energy profile of the MR, and wherein the wireless communication action comprises transmitting a signal having a signal type, wherein the signal type is based on the energy profile.

Aspect 66: The method of Aspect 65, further comprising receiving energy profile information corresponding to the energy profile.

Aspect 67: The method of any of Aspects 41-66, wherein the wireless communication action is associated with at least one of: an inter-frequency synchronization signal block (SSB) monitoring operation associated with a serving cell, an intra-frequency SSB monitoring operation associated with a serving cell, an inter-frequency SSB monitoring operation associated with a neighbor cell, an intra-frequency SSB monitoring operation associated with a neighbor cell, an inter-frequency radio resource management (RRM) operation associated with a serving cell, an intra-frequency RRM operation associated with a serving cell, an inter-frequency RRM operation associated with a neighbor cell, or an intra-frequency RRM operation associated with a neighbor cell.

Aspect 68: The method of any of Aspects 41-67, wherein an operating parameter associated with the wireless communication action is based on the WUR class.

Aspect 69: The method of Aspect 68, wherein the operating parameter comprises at least one of: an expected synchronization time, a minimum periodicity of a synchronization signal, a paging frequency, a modem power associated with a sleep state, a modem power associated with a wake up signal reception state, a power profile of the WUR, a power state, a power consumption associated with a power state, a wake up time based on a wake up indication, or a restriction associated with a restricted wake up time.

Aspect 70: The method of either of Aspects 68 or 69, wherein the configuration characteristic corresponds to a degree of integration between the WUR and the MR, and wherein the operating parameter comprises a switching time associated with switching operation between the WUR and the MR.

Aspect 71: The method of any of Aspects 68-70, wherein the operating parameter comprises at least one of: clock information, or a clock accuracy.

Aspect 72: The method of Aspect 71, further comprising transmitting, based on the clock accuracy and the configuration characteristic, a low power signal configuration.

Aspect 73: The method of any of Aspects 41-72, wherein the operating parameter comprises at least one of a value, a range of values, or a statistic associated with a value.

Aspect 74: The method of any of Aspects 41-73, further comprising transmitting an indication of a switching time associated with switching operation between the WUR and the MR.

Aspect 75: The method of any of Aspects 41-74, wherein the WUR class is associated with an MR type.

Aspect 76: The method of any of Aspects 41-75, wherein the wireless communication action is based on a WUR discontinuous reception (DRX) configuration, and wherein the WUR DRX configuration is based on the WUR class.

Aspect 77: The method of Aspect 76, wherein the WUR class corresponds to a UE type.

Aspect 78: The method of any of Aspects 41-77, wherein the wireless communication action is based on a main radio (MR) discontinuous reception (DRX) configuration, and wherein the MR DRX configuration is based on at least one of the WUR class or a UE class.

Aspect 79: The method of any of Aspects 41-78, wherein the configuration characteristic corresponds to at least one of a band, a band combination, a frequency range, a bandwidth part, a bandwidth combination, a component carrier, or a component carrier combination.

Aspect 80: The method of any of Aspects 41-79, wherein the wireless communication action is based on at least one of a band, a band combination, a frequency range, a bandwidth part, a bandwidth combination, a component carrier, or a component carrier combination.

Aspect 81: An apparatus for wireless communication at a device, comprising a processor; memory coupled with the processor; and instructions stored in the memory and executable by the processor to cause the apparatus to perform the method of one or more of Aspects 1-40.

Aspect 82: A device for wireless communication, comprising a memory and one or more processors coupled to the memory, the one or more processors configured to perform the method of one or more of Aspects 1-40.

Aspect 83: An apparatus for wireless communication, comprising at least one means for performing the method of one or more of Aspects 1-40.

Aspect 84: A non-transitory computer-readable medium storing code for wireless communication, the code comprising instructions executable by a processor to perform the method of one or more of Aspects 1-40.

Aspect 85: A non-transitory computer-readable medium storing a set of instructions for wireless communication, the set of instructions comprising one or more instructions that, when executed by one or more processors of a device, cause the device to perform the method of one or more of Aspects 1-40.

Aspect 86: An apparatus for wireless communication at a device, comprising a processor; memory coupled with the processor; and instructions stored in the memory and executable by the processor to cause the apparatus to perform the method of one or more of Aspects 41-80.

Aspect 87: A device for wireless communication, comprising a memory and one or more processors coupled to the memory, the one or more processors configured to perform the method of one or more of Aspects 41-80.

Aspect 88: An apparatus for wireless communication, comprising at least one means for performing the method of one or more of Aspects 41-80.

Aspect 89: A non-transitory computer-readable medium storing code for wireless communication, the code comprising instructions executable by a processor to perform the method of one or more of Aspects 41-80.

Aspect 90: A non-transitory computer-readable medium storing a set of instructions for wireless communication, the set of instructions comprising one or more instructions that, when executed by one or more processors of a device, cause the device to perform the method of one or more of Aspects 41-80.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
  one or more memories; and
  one or more processors, coupled to the one or more memories, configured to:
    transmit, to a network node, a class indication that indicates a wake up radio (WUR) class of a WUR associated with the UE, the UE comprising the WUR and a main radio (MR), and the WUR class corresponding to a configuration characteristic of the WUR, wherein the class indication indicates a power consumption model of the WUR; and
    perform a wireless communication action based on the configuration characteristic of the WUR.

2. The UE of claim 1, wherein the one or more processors, to transmit the class indication, are configured to transmit the class indication using the WUR.

3. The UE of claim 1, the UE comprising a main radio (MR) that is different than the WUR, the one or more processors, to transmit the class indication, are configured to transmit the class indication using the MR.

4. The UE of claim 1, wherein the configuration characteristic corresponds to a UE capability.

5. The UE of claim 4, wherein the UE capability comprises at least one of:
  a capability for decoding physical downlink control channel (PDCCH) based control signals,
  a capability for detecting on-off keying (OOK) based control signals,
  a capability for decoding OOK based control signals,
  a capability for decoding sequence based control signals,
  a capability for detecting orthogonal frequency-division multiplexing (OFDM) based reference signals,
  a capability for detecting OOK based reference signals, a capability for detecting sequence based reference signals,
  a capability for detecting OFDM based synchronization signals,
  a capability for detecting OOK based synchronization signals, or
  a capability for detecting sequence based synchronization signals.

6. The UE of claim 1, wherein the one or more processors, to perform the wireless communication action, are configured to perform a class-based radio resource management (RRM) operation, wherein capability and class-based RRM operation based on at least one of a frequency range, a frequency band, or a frequency band combination.

7. The UE of claim 6, wherein the one or more processors, to perform the class-based RRM operation, are configured to perform a relaxed radio resource management (RRM) operation or offloading one or more RRM operations from the WUR to the MR.

8. The UE of claim 1, wherein the WUR comprises a passive radio frequency identification (RFID) tag radio, wherein the WUR uses an amount of energy from an energy storage unit that satisfies an energy threshold.

9. The UE of claim 1, wherein the WUR comprises a function of the MR, the function corresponding to a semi-passive radio frequency identifier (RFID) tag radio operation.

10. The UE of claim 1, wherein the configuration characteristic of the WUR corresponds to at least one of a radio frequency energy harvesting operation, a solar energy harvesting operation, a thermal energy harvesting operation, a light energy harvesting operation, or a laser energy harvesting operation.

11. The UE of claim 1, wherein the WUR comprises at least one of a semi-active radio frequency identifier (RFID) tag radio or an active RFID tag radio.

12. The UE of claim 1, wherein the WUR comprises at least one of a hardware component of the MR, a software component of the MR, a radio-frequency component of the MR, or a firmware component of the MR.

13. The UE of claim 1, wherein the UE comprises a hybrid radio that includes the WUR and the MR.

14. The UE of claim 1, wherein the configuration characteristic comprises at least one of an energy profile of the WUR or an energy profile of the MR, and wherein the one or more processors, to perform the wireless communication action, are configured to receive a signal having a signal type, wherein the signal type is based on the energy profile.

15. The UE of claim 1, wherein the one or more processors, to perform the wireless communication action, are configured to perform at least one of:
  an inter-frequency synchronization signal block (SSB) monitoring operation associated with a serving cell,
  an intra-frequency SSB monitoring operation associated with a serving cell,
  an inter-frequency SSB monitoring operation associated with a neighbor cell,
  an intra-frequency SSB monitoring operation associated with a neighbor cell,
  an inter-frequency radio resource management (RRM) operation associated with a serving cell,
  an intra-frequency RRM operation associated with a serving cell,
  an inter-frequency RRM operation associated with a neighbor cell, or
  an intra-frequency RRM operation associated with a neighbor cell.

16. The UE of claim 1, wherein an operating parameter associated with the wireless communication action is based on the WUR class.

17. The UE of claim 16, wherein the operating parameter comprises at least one of:

an expected synchronization time, a minimum periodicity of a synchronization signal, a paging frequency, a modem power associated with a sleep state, a modem power associated with a wake up signal reception state, a power profile of the WUR, a power state, a power consumption associated with a power state, a wake up time based on a wake up indication, a restriction associated with a restricted wake up time, clock information, or a clock accuracy.

18. The UE of claim 16, wherein the configuration characteristic corresponds to a degree of integration between the WUR and the MR, and wherein the operating parameter comprises a switching time associated with switching operation between the WUR and the MR.

19. The UE of claim 1, wherein the one or more processors are further configured to receive an indication of a switching time associated with switching operation between the WUR and the MR.

20. The UE of claim 1, wherein the WUR class is associated with an MR type.

21. The UE of claim 1, wherein the one or more processors, to perform the wireless communication action, are configured to perform the wireless communication action based on a WUR discontinuous reception (DRX) configuration, and wherein the WUR DRX configuration is based on the WUR class.

22. The UE of claim 1, wherein the one or more processors, to perform the wireless communication action, are configured to perform the wireless communication action based on a main radio (MR) discontinuous reception (DRX) configuration, and wherein the MR DRX configuration is based on at least one of the WUR class or a UE class.

23. The UE of claim 1, wherein the configuration characteristic corresponds to at least one of a band, a band combination, a frequency range, a bandwidth part, a bandwidth combination, a component carrier, or a component carrier combination.

24. The UE of claim 1, wherein the one or more processors, to perform the wireless communication action, are configured to perform the wireless communication action based on at least one of a band, a band combination, a frequency range, a bandwidth part, a bandwidth combination, a component carrier, or a component carrier combination.

25. A network node for wireless communication, comprising:

one or more memories; and one or more processors, coupled to the one or more memories, configured to:

receive, from a user equipment (UE), a class indication that indicates a wake up radio (WUR) class of a WUR associated with the UE, the UE comprising the WUR and a main radio (MR), and the WUR class corresponding to a configuration characteristic of the WUR wherein the class indication indicates a power consumption model of the WUR; and perform a wireless communication action based on the configuration characteristic of the WUR.

26. The network node of claim 25, wherein the configuration characteristic corresponds to a UE capability.

27. A method of wireless communication performed by an apparatus of a user equipment (UE), comprising:

transmitting, to a network node, a class indication that indicates a wake up radio (WUR) class of a WUR associated with the UE, the UE comprising the WUR and a main radio (MR), and the WUR class corresponding to a configuration characteristic of the WUR wherein the class indication indicates a power consumption model of the WUR; and performing a wireless communication action based on the configuration characteristic of the WUR.

28. The method of claim 27, wherein the configuration characteristic corresponds to a UE capability.

29. A method of wireless communication performed by an apparatus of a network node, comprising:

receiving, from a user equipment (UE), a class indication that indicates a wake up radio (WUR) class of a WUR associated with the UE, the UE comprising the WUR and a main radio (MR), and the WUR class corresponding to a configuration characteristic of the WUR wherein the class indication indicates a power consumption model of the WUR; and performing a wireless communication action based on the configuration characteristic of the WUR.

30. The method of claim 29, wherein the configuration characteristic corresponds to a UE capability.

* * * * *